United States Patent
Jagota

(10) Patent No.: US 11,244,004 B2
(45) Date of Patent: Feb. 8, 2022

(54) GENERATING ADAPTIVE MATCH KEYS BASED ON ESTIMATING COUNTS

(71) Applicant: salesforce.com, inc., San Francisco, CA (US)

(72) Inventor: Arun Kumar Jagota, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 203 days.

(21) Appl. No.: 16/661,715

(22) Filed: Oct. 23, 2019

(65) Prior Publication Data
US 2021/0124779 A1 Apr. 29, 2021

(51) Int. Cl.
| | | |
|---|---|---|
| *G06F 16/90* | (2019.01) | |
| *G06F 16/901* | (2019.01) | |
| *G06F 16/903* | (2019.01) | |
| *G06F 16/906* | (2019.01) | |
| *G06F 16/93* | (2019.01) | |
| *G06F 16/908* | (2019.01) | |

(52) U.S. Cl.
CPC ........ *G06F 16/9024* (2019.01); *G06F 16/906* (2019.01); *G06F 16/908* (2019.01); *G06F 16/90348* (2019.01); *G06F 16/93* (2019.01)

(58) Field of Classification Search
CPC ............. G06F 16/9038; G06F 16/9535; G06F 16/9537
USPC ........................ 707/798, E17.142, 793, 999.1
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Baoquoc N To
(74) *Attorney, Agent, or Firm* — Dergosits & Noah LLP; Todd A. Noah

(57) ABSTRACT

A system creates a graph of nodes connected by edges, the nodes including: i) a first node associated with a first value and a count of the first value, and ii) a second node associated with a second value and a count of the second value, the edges including an edge that connects the first and second nodes and is associated with a count of instances of the first value being stored with the second value. The system includes each node and each associated with clique count less than clique threshold in keys sets and deletes each node and each edge associated with clique count less than clique threshold. The system identifies triplet nodes connected by triplet edges. If estimated clique count for triplet values represented by triplet nodes is less than clique threshold, the system includes triplet values in keys set and identify triplet of nodes as analyzed.

20 Claims, 19 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,760,619 B1 * | 9/2017 | Lattanzi .............. G06F 16/9024 |
| 10,419,469 B1 * | 9/2019 | Singh ..................... H04L 43/06 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0267903 A1 * | 12/2005 | Golze .................... G06Q 10/10 |
| 2006/0005118 A1 * | 1/2006 | Golze .................... G06F 16/904 |
| | | 715/205 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2018/0004751 A1 * | 1/2018 | Vikhe ............... G06F 16/24578 |
| 2019/0099653 A1 * | 4/2019 | Wanke ............... A63B 24/0062 |
| 2020/0218968 A1 * | 7/2020 | Gliozzo ............... G06N 3/0436 |

* cited by examiner

GENERATING ADAPTIVE MATCH KEYS BASED ON ESTIMATING COUNTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data may become extremely complex and dynamic due to the many changes that individual customers go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all customer related records to create a single master profile for each customer, and then provides access to these master profiles and their cross references to business applications. The master profile construction process involves using match keys to match specific fields of customer data records, followed by clustering sets of customer records for the same customers, and finally by merging the clusters to create master profiles. For example, a cluster contains 5 records for the same customer, comprised of 3 distinct given name field values, such as R., Robert, and Bob. The merging process determines which of these 3 values (or possibly some other value) should be listed as the given name in the customer's master profile.

A database system's process that determines whether any existing records sufficiently match any other existing database records could be an intensive process that matches multiple values between these records, thereby consuming a significant amount of system resources. The reason that such a matching process would be intensive is that any particular record would need to be matched against all of the records, which is possibly millions of records. Since this matching would need to be done for every record, the matching process could include millions multiplied by millions of potential matches. Consequently, a database system can initially identify any existing database records that match only one or two corresponding values stored by an existing record in a shallow matching process that consumes a relatively limited amount of system resources. Shallow matching takes a given record and narrows down records that potentially match the given record from the full set of records to a very small set of potentially matching records. Therefore, shallow matching of records is faster because index lookups narrows the potential match candidates. Non-candidate records are not matched at all by shallow matching or deep matching. Then the database system can apply an intensive multiple-value matching process to each of the relatively small number of shallow matching records in the existing database records, thereby collectively reducing system resource consumption.

The database system can use the generated master profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their master profile, especially in the purchase record(s) of the relevant item, so as to enable the company's customer service department to process the service request more effectively.

A database system's process that determines whether newly received database records sufficiently match existing database records could be an intensive process that matches multiple values between these records, because the number of existing database records may be very large, even if there are only a few newly received records in any given time period, thereby consuming a significant amount of system resources. Consequently, a database system can initially identify any existing database records that match only one or two corresponding values stored by a newly received database record in a shallow matching process that consumes a relatively limited amount of system resources. Then the database system can apply an intensive multiple-value matching process to each of the relatively small number of shallow matching database records in the existing database records, thereby collectively reducing system resource consumption.

Therefore, the database system can create match keys from values stored by existing database records and/or by newly received database records, and then use the match keys to identify the existing database records that shallow match newly received database records. The design of match keys takes recall and performance into consideration. Recall is the percentage of actual matching records that are identified by a database system. To achieve the ideal of 100% recall, a database system may need to treat every existing record in the database as a candidate for matching every other existing database record or every newly received database record, which typically is not feasible, performance-wise. At the other extreme of the recall/performance spectrum, a database system can quickly search database records by using narrowly focused match keys, but narrowly focused match keys may fail to identify some matching database records.

There are some scenarios when match keys need to be composed of triplets of values. For example. a database of one million person profiles receives a new record in which the first name is John, the last name is Smith, the city is San Francisco, and no other fields include any data. Before adding this record to the database, the database system will need to search the database for all records that could identify a John Smith in the city of San Francisco to determine if the new record matches any existing records. However, using any match key which includes the values from at most two fields risks returning too many results, which would have to be pruned. There may be too many John Smiths, too many Johns in the city of San Francisco, or too many Smiths in the city of San Francisco.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 3A-I illustrate more example data structures used for generating adaptive match keys based on estimating counts, in an embodiment;

DETAILED DESCRIPTION

General Overview

Figure 1A:
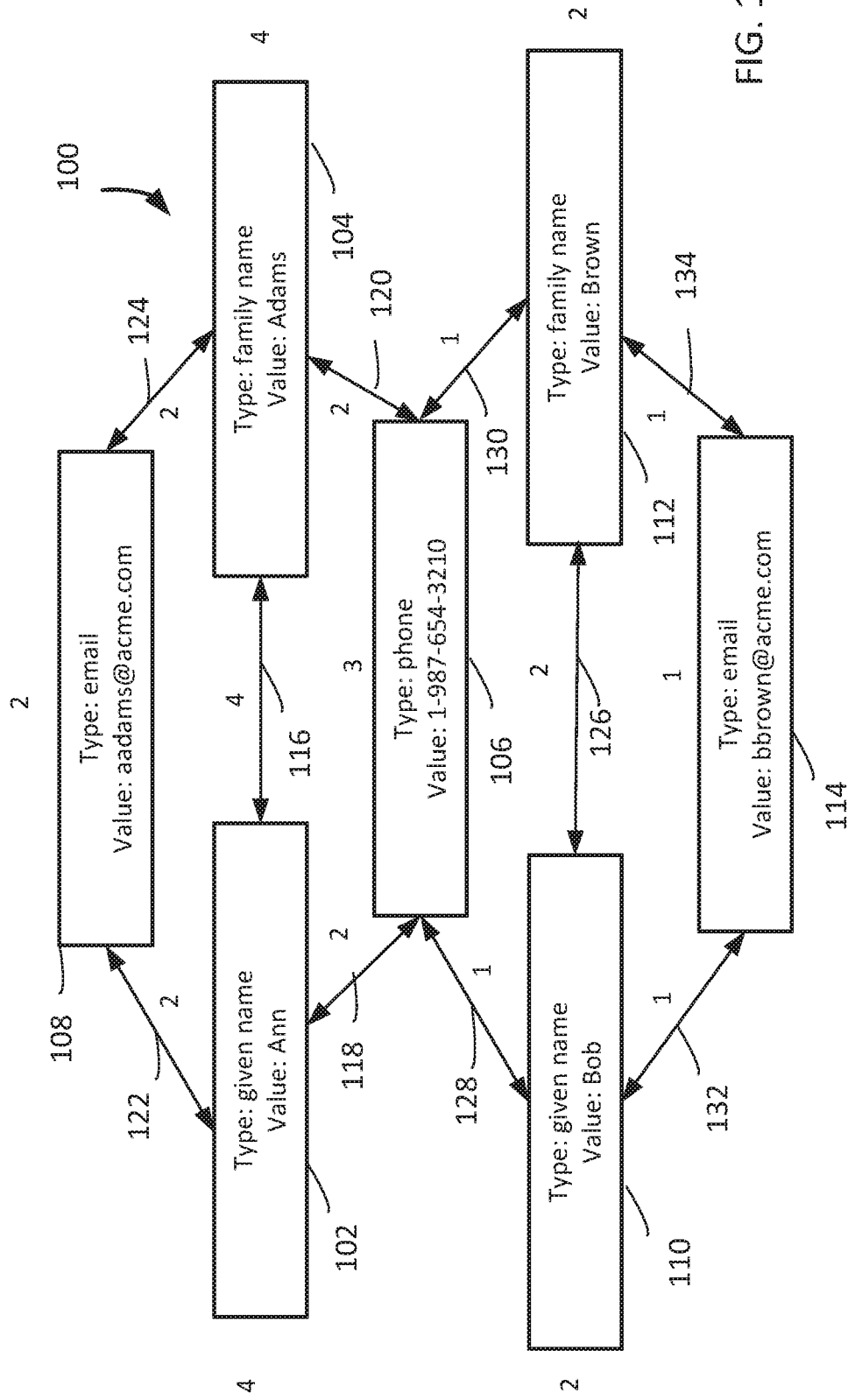
FIGS. 1A-F illustrate example data structures used for generating adaptive match keys, in an embodiment.

In accordance with embodiments described herein, there are provided methods and systems for generating adaptive match keys based on estimating counts. A system creates a graph of nodes connected by edges. The nodes include: i) a first node associated with a first value and a count of the first value, and ii) a second node associated with a second value and a count of the second value. The edges include an edge that connects the first and second nodes and is associated with a count of instances of the first value being stored with the second value. The system includes each node that is associated with any clique count which is less than a clique threshold in a first set of keys. The system deletes each node that is associated with any clique count which is less than the clique threshold. The system includes each edge that is associated with any clique count which is less than the clique threshold in a second set of keys. The system deletes each edge that is associated with any clique count which is less than the clique threshold. The system identifies a triplet of nodes that are connected by a triplet of edges. The system estimates a clique count associated with a triplet of values which are represented by the triplet of nodes. If the estimated clique count is less than the clique threshold, the system includes the triplet of values in a third set of keys, and then identifies the triplet of nodes as having been analyzed. The system matches new records by using each set of keys to search corresponding records.

For example, a customer resolution engine generates a graph based on the database records which were created after 8 different corporations' employees named John Jones, John Smith, Ann Jones, and Ann Smith entered their names and either their city or their email address during 2,000 occasions when they visited MegaCorp's marketing website or retail website. The customer resolution engine uses a clique threshold of 81, and since some nodes have clique counts which are less than the clique threshold of 81, the customer resolution engine identifies the values of these nodes as email address keys, and deletes these nodes, which deletes the edges that connect to these nodes. The customer resolution engine identifies the triplet of nodes representing San Jose, Ann, Jones and the triplet of nodes representing San Francisco, John, Smith. The customer resolution engine uses the Jensen-Shannon divergence to estimate the clique count of 90 for the triplet of nodes representing San Jose, Ann, Jones. Since the estimated clique count of 90 is less than the subsequently incremented clique threshold of 91, the customer resolution engine identifies the triple of values [San Jose, Ann, Jones] as a match key. The customer resolution engine uses the Jensen-Shannon divergence to estimate the clique count of 495 for the triplet of nodes representing San Francisco, John, Smith. Since the estimated clique count of 495 is not less than the incremented clique threshold of 91, the customer resolution engine excludes the triple of values [San Francisco, John, Smith] as a match key. The customer resolution engine uses the match key [Ann, Jones, San Jose] to efficiently search and match MegaCorp's existing records for Ann Jones when she enters her name and San Jose while visiting MegaCorp's marketing website. The customer resolution engine generates match keys that have a near-perfect recall (they almost never miss any matches) while being orders of magnitude faster than a naive approach that would deep-match all pairs of database records.

Systems and methods are provided for generating adaptive match keys based on estimating counts. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a data structure for generating adaptive match keys. Next, methods and systems for generating adaptive match keys will be described with reference to example embodiments.

While one or more implementations and techniques are described with reference to an embodiment in which generating adaptive match keys is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A customer resolution engine can cleanse, normalize, and enrich customer data as needed. For example, a traditional match rule for uniquely identifying a person may process the data set that includes "John Smith/1 Main St, San Francisco, Calif. 94105" and "John Smith/11 Main St, San Francisco, Calif. 94105," and identify two unique people. While a traditional match rule can match addresses by using "fuzzy" strings, in isolation this fuzzy matching can lead to false positives, as there could be two different John Smiths at different addresses. In contrast, the customer resolution engine can more intelligently apply matching rules by incorporating customer data reliability into the matching process. For this example, the customer resolution engine captures and leverages data validation and enrichment attributes as part of the attributes to determine that "11 Main St" is not a valid street address for "San Francisco, Calif. 94105," infer a data entry error in the street number, and then identify the nearest string or geo-proximity match as a reliable candidate, thereby identifying only one unique John Smith on Main Street in San Francisco.

The customer resolution engine can use a similar approach in assessing reliability of an attribute value for uniqueness. For example, a traditional match rule "Name AND (Phone Number OR Email)" would process the data set that includes "John Smith/415-555-1212/john.smith@gmail.com," "John Smith/415-555-1212/john_smith@gmail.com," and "Cary Jones/415-555-1212/cary@joneses.com," and then identify two unique people, John Smith and Cary Jones. In contrast, the customer resolution engine can more intelligently apply matching rules by identifying how many unique source records, names, and email addresses relate to any given phone number, or vice versa. By identifying that a specific phone number is commonly used across many records, where other match condition attributes did not match, such as name and email address, the customer resolution engine can apply a matching rule that processes the specific phone number as a shared attribute value, which is not a unique attribute value, thereby identifying two unique John Smiths who share the phone number 415-555-1212.

The customer resolution engine processes database records that have n attributes, referred to as $X_1, X_2, \ldots X_n$, with each attribute having its own discrete set of values referred to as $V_1, V_2, \ldots V_n$. Examples of attributes include first_name, last_name, phone number, and city. Numeric attributes are assumed to have been suitably discretized. The customer resolution engine generates an n-partite graph whose nodes partition into $V_1, V_2, \ldots V_n$, where $V_i$ denotes the set of values of attribute $X_i$. The customer resolution engine does not connect nodes in the same part by an edge, due to the constraint that in any given database record and for any i, $X_i$ takes on at most one value from $V_i$. $X_i$ may not take on any value in a given database record.

The weight on node v is the number of database records in a given set S that contain the attribute: value pair associated with the node v. The weight on edge {u, v} is the number of database records in S that contain the attribute: value pair associated with both of the nodes u and v. The customer resolution engine can efficiently compute the weights on all the nodes and the edges of the graph in one pass over the data set. When the customer resolution engine encounters a new database record, the customer resolution engine increments by 1 the weights of the nodes and edges that correspond to the new database record. A clique can be a set of one or more nodes where each pair of nodes is connected by an edge. A clique's weight can be the sum of the weights of the nodes and the edges in the clique.

FIGS. 1A-F depict graphs that the customer resolution engine generates based on the following example database records. After Acme Corporation employee Ann Adams enters her name and Acme's main phone number while visiting MegaCorp's marketing website, the database system creates the first database record that stores "Ann," "Adams," and "1-987-654-3210." Following Ann Adams entering her name and Acme email address while visiting MegaCorp's retail website, the database system creates the second database record that stores "Ann," "Adams," and "aadams@acme.com." When Acme Corporation employee Bob Brown enters his name and Acme's main phone number while visiting MegaCorp's marketing website, the database system creates the third database record that stores "Bob," "Brown," and "1-987-654-3210." After Bob Brown enters his name and Acme email address while visiting MegaCorp's retail website, the database system creates the fourth database record that stores "Bob," "Brown," and "bbrown@acme.com." Following Ann Adams entering her name and Acme's main phone number while visiting MegaCorp's marketing website again, the database system creates the fifth database record that stores "Ann," "Adams," and "1-987-654-3210." When Ann Adams enters her name and Acme email address while visiting MegaCorp's retail website again, the database system creates the sixth database record that stores "Ann," "Adams," and "aadams@acme.com."

Continuing this example, the customer resolution engine generates the graph 100 based on these six database records, as depicted by FIG. 1A. The graph 100 includes nodes representing attribute values and edges connecting the nodes, with each edge representing a number of instances that one connected node's attribute value is associated with the other connected node's attribute value. For example, the graph 100 includes the given name node 102 that represents the attribute value "Ann," the family name node 104 that represents the attribute value "Adams," the phone node 106 that represents the attribute value "1-987-654-3210," and the email node 108 that represents the attribute value "aadams@acme.com." The graph 100 also includes the given name node 110 that represents the attribute value "Bob," the family name node 112 that represents the attribute value "Brown," and the email node 114 that represents the attribute value "bbrown@acme.com."

The weight of 4 for the node 102 represents the 4 instances that "Ann" is stored by the 6 database records, the weight of 4 for the node 104 represents the 4 instances that "Adams" is stored by the 6 database records, the weight of 3 for the node 106 represents the 3 instances that "1-987-654-3210" is stored by the 6 database records, and the weight of 2 for the node 108 represents the 2 instances that "aadams@acme.com" is stored by the 6 database records. Similarly, the weight of 2 for the node 110 represents the 2 instances that "Bob" is stored by the 6 database records, the weight of 2 for the node 112 represents the 2 instances that "Brown" is stored by the 6 database records, and the weight of 1 for the node 114 represents the 1 instance that "bbrown@acme.com" is stored by the 6 database records.

The edge 116 connects the nodes 102 and 104, and has a weight of 4 that represents the 4 instances of "Ann" and "Adams" being stored together in the 6 database records; the edge 118 connects the nodes 102 and 106, and has a weight of 2 that represents the 2 instances of "Ann" and "1-987-654-3210" being stored together in the 6 database records, and the edge 120 connects the nodes 104 and 106, and has a weight of 2 that represents the 2 instances of "Adams" and "1-987-654-3210" being stored together in the 6 database records. The edge 122 connects the nodes 102 and 108, and has a weight of 2 that represents the 2 instances of "Ann" and "aadams@acme.com" being stored together in the 6 database records; and the edge 124 connects the nodes 104 and 108, and has a weight of 2 that represents the 2 instances of "Adams" and "aadams@acme.com" being stored together in the 6 database records.

The edge 126 connects the nodes 110 and 112, and has a weight of 2 that represents the 2 instances of "Bob" and "Brown" being stored together in the 6 database records; the edge 128 connects the nodes 110 and 106, and has a weight of 1 that represents the 1 instance of "Bob" and "1-987-654-3210" being stored together in the 6 database records, and the edge 130 connects the nodes 112 and 106, and has a weight of 1 that represents the 1 instance of "Brown" and "1-987-654-3210" being stored together in the 6 database records. The edge 132 connects the nodes 110 and 114, and has a weight of 1 that represents the 1 instance of "Bob" and "bbrown@acme.com" being stored together in the 6 database records; and the edge 134 connects the nodes 112 and 114, and has a weight of 1 that represents the 1 instances of "Brown" and "bbrown@acme.com" being stored together in the 6 database records. Although the graph 100 depicts nodes, edges, and weights for only four attributes (given name, family name, email, and phone) based on only six database records, the customer resolution engine can generate a graph that depicts nodes, edges, and weights for any number of attributes based on any number of database records.

Clustering analysis may be run on the graph to discover clusters of nodes which may be grouped together as a clique. These nodes can further be refined and analyzed to distill a master profile, which may be referred to as an entity 360 view, that can then be used for a number of business use cases. Any attribute value may be shared by multiple cliques. However, sharing, in general, is constrained to fairly tight social groups, such as a household, a company, roommates, etc. Since the main use case is to connect an attribute value to a small number of master profiles, any attribute value that has a high number of edges may be handled differently, such as by being removed from the graph. Consequently, the graph is a collection of many smaller cliques.

The graph may be an undirected, weighted, and colored data structure. The graph may be "undirected" because there is no directionality of the edges that represent relationships. All that is known is that attribute value A is connected to attribute value B, such as the given name "Ann" is connected to the family name "Adams." The graph may be "weighted" because some relationships between attribute values are stronger than other relationships between attribute values. For example, if the same email address and the same phone number are connected together by data from multiple sources, instead of adding multiple edges, the weight of the edge connecting the phone number and the email address is incremented. This weighting provides useful meta data for clustering algorithms. The graph may be "colored" because not all edges may be the same, as different edges may represent different types of relationships. For example, one edge may represent a business relationship, such as an edge that connects a customer's name to the customer's business email address, and another edge may represent a personal relationship, such as an edge that connects the customer's name to the customer's personal email address. Colored edges represent useful metadata for clustering and for constructing master profiles.

Since a set of one or more nodes represents a set of attributes taking on unique values from their value sets, the customer resolution engine generates each match key from a corresponding set of one or more nodes that forms a corresponding clique. The clique constraint increases the likelihood that the values go together, such that the values are not mutually incompatible. Generally speaking, the customer resolution engine favors smaller cliques over larger cliques because the smaller the clique, the fewer the attributes whose values are constrained, hence the higher its recall, which is the number of records found by a lookup on a match key. Since the data in a database record is often sparse, such that only a few values may be stored by the database record, the customer resolution engine may have no choice but to use small cliques as match keys. The customer resolution engine favors using lower-weight cliques, which is similar to "cherry-picking," over higher-weight cliques because using higher-weight cliques risks having too many records, which is not performant.

Once the customer resolution engine had identified a specific clique to be a match key, the customer resolution engine will discard all cliques that are proper supersets of the identified clique as candidates for being match keys because proper supersets of good match keys are redundant. A clique that has already been identified as a match key meets the necessary condition, such that a super set key can only have lower recall.

The customer resolution engine's algorithm inputs a support parameter W:
G=n-partite graph with node and edge weights.
A: for k=1 to n do // or stop before reaching n
Identify in G all k-node cliques of weight at most W
Delete the node of any identified single node clique from G
Delete one edge of any identified multiple node cliques from G.
If G is not empty, increase W and return to A.

Figure 2:
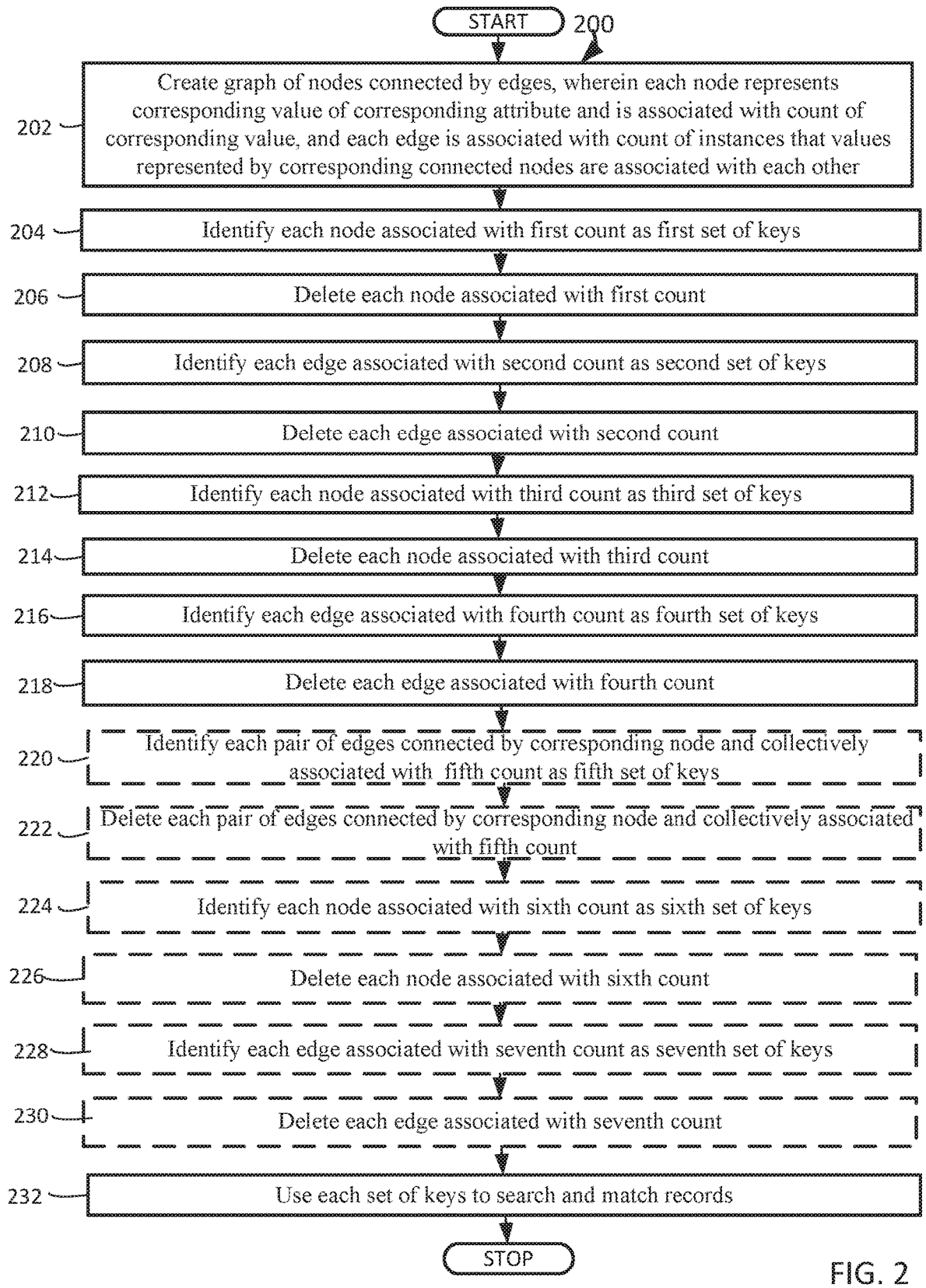
FIG. 2 is an operational flow diagram illustrating a high-level overview of a method for generating adaptive match keys, in an embodiment.

FIG. 2 is an operational flow diagram illustrating a high-level overview of a method 200 for generating adaptive match keys. A graph of nodes connected by edges is created, wherein each node represents a corresponding value of a corresponding attribute and is associated with a count of the corresponding value, and each edge is associated with a count of instances that values represented by corresponding connected nodes are associated with each other, block 202.

The database system creates a graph of cliques that will be identified as matching keys. For example, and without limitation, this can include a customer resolution engine generating the graph 100 depicted by FIG. 1A, based on the six database records described above, which were created after Acme Corporation employees Ann Adams and Bob Brown entered their names and Acme email address or Acme's main phone number each time that they visited MegaCorp's marketing website and retail website. In the following examples, the graph 100 is a 4-partite graph because the graph 100 represents values for the 4 attributes given name, family name, phone, and email, such that the algorithm variable n equals 4.

A graph can be a diagram showing the relation between variable quantities. A node can be a point at which lines or pathways intersect or branch; a central or connecting point. An edge can be a line extending from one node to another node. A value can be a symbol on which operations are performed by a computer. An attribute can be a piece of information that determines the properties of a field in a database. A count can be an arithmetical value, expressed by a word, symbol, or figure, representing a particular quantity and used in making calculations. An instance can be an example or single occurrence of something. A connected node can be a point at which lines or pathways intersect or branch.

After creating a graph, each node associated with a first count is identified as a first set of keys, block 204. The database system identifies each single node clique with the weight of one as a match key. By way of example and without limitation, this can include the customer resolution engine identifying the node 114 with the weight of 1 as the match key {bbrown@acme.com}. A set can be zero or more things that belong or are used together. A key can be at least one field in a record that is used to lookup the record. When identifying the node 114 with the weight of 1 as a match key, the customer resolution engine favors smaller cliques over larger cliques and favors lower-weight cliques over higher-weight cliques. In this example, the algorithm variable k equals 1 and the algorithm variable W equals 1.

Having identified each node associated with a first count, each node associated with the first count is deleted, block 206. The database system deletes each one-node clique that was identified as a match key. In embodiments, this can include the customer resolution engine deleting the node 114, which also deletes the edges 132 and 134 that connect the node 114 to other nodes, from the graph 100 depicted by FIG. 1A, thereby creating the graph 136 depicted by FIG. 1B. By deleting the clique that is the node 114 which was identified as a match key, the customer resolution engine discards all cliques that are proper supersets of the node 114 as candidates for being match keys.

Figure 1B:
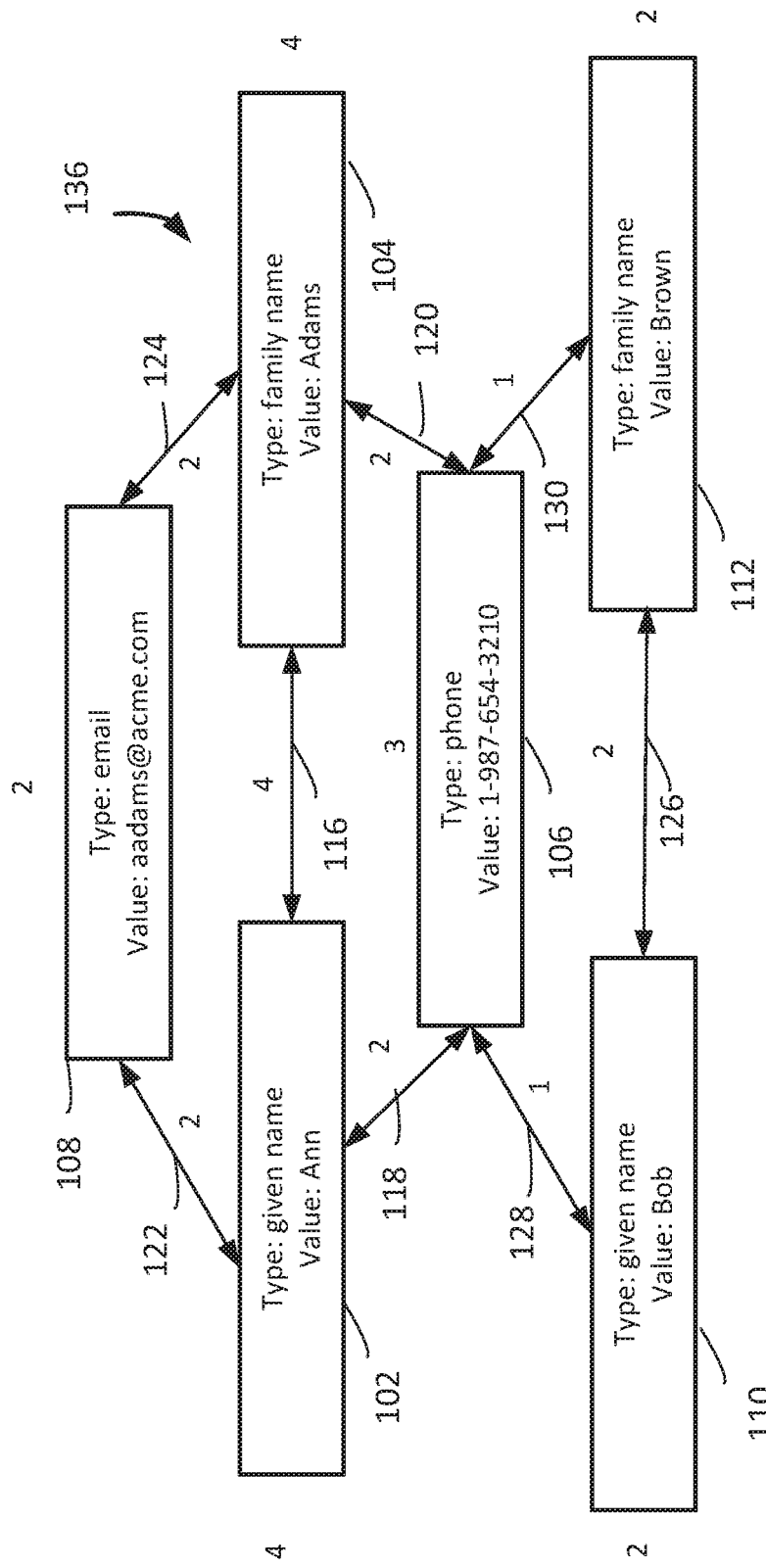
Figure 1C:
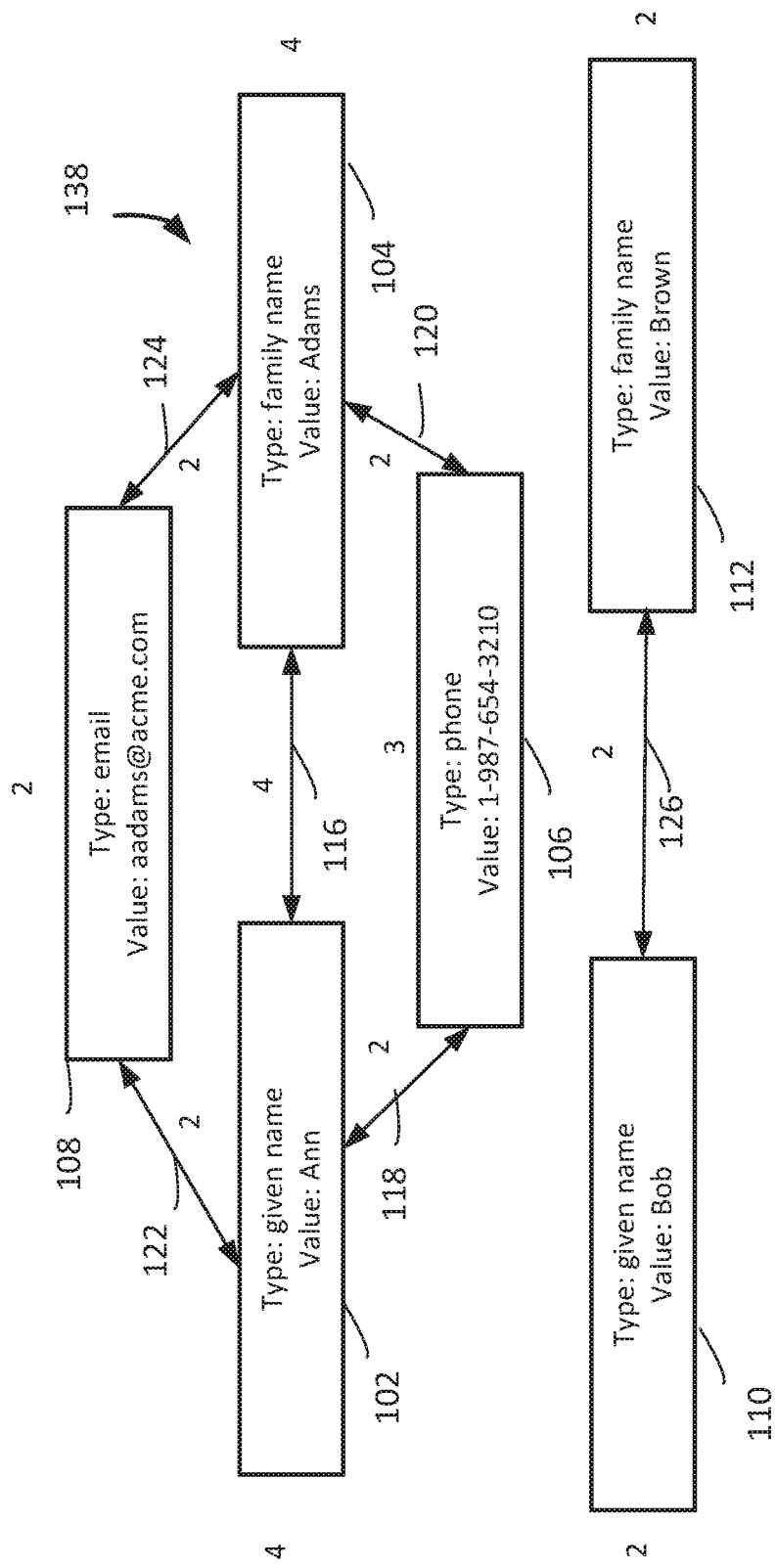
Figure 1D:
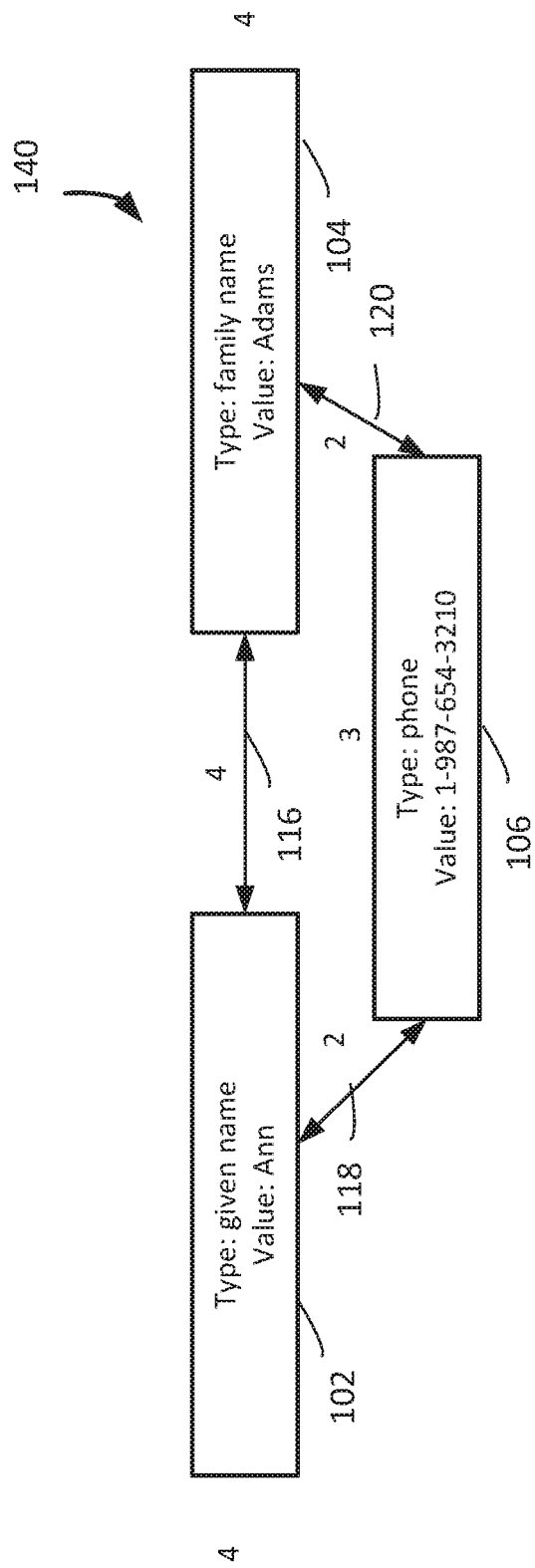
Figure 1E:
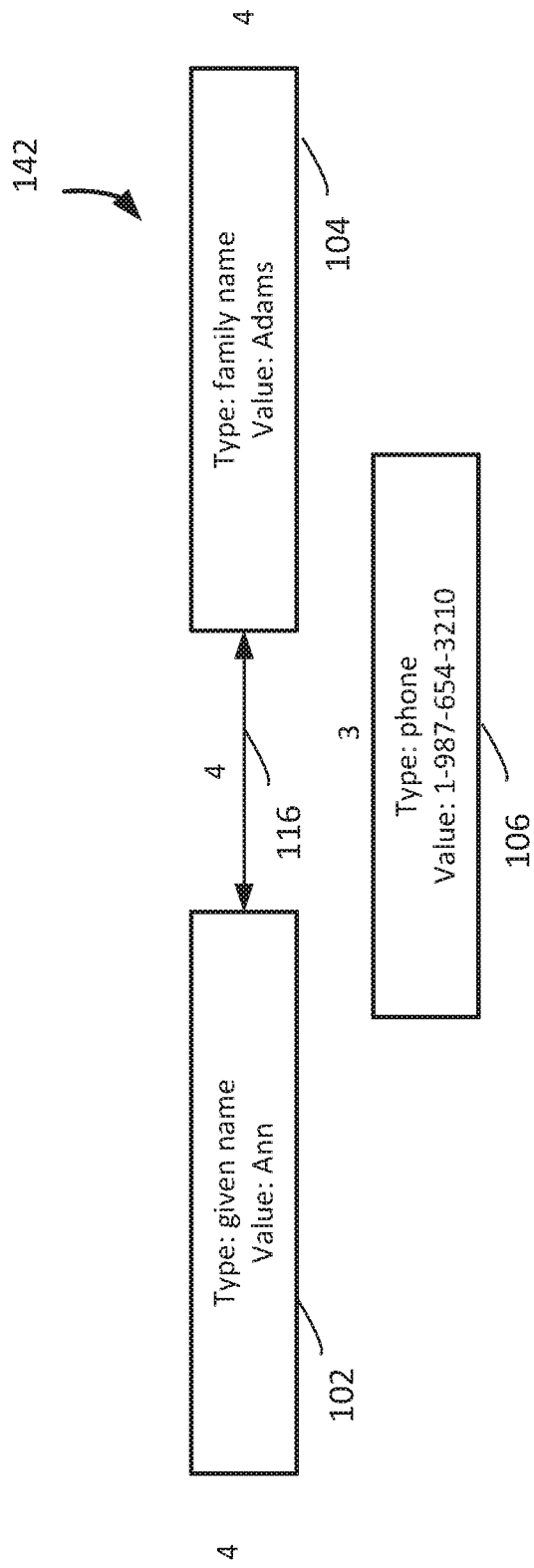

Following the creation of a graph, each edge associated with a second count is identified as a second set of keys, block 208. The database system identifies each double node clique connected by an edge with the weight of one as a match key. For example, and without limitation, this can include the customer resolution engine identifying the edge 128 that has a weight of 1 and connects the nodes 110 and 106 as the match key {Bob, 1-987-654-3210}, and the edge 130 that has a weight of 1 and connects the nodes 112 and 106 as the match key {Brown, 1-987-654-3210}, as depicted by FIG. 1B. The customer resolution engine would have identified the edges 132 and 134 that have the weights of 1 as match keys, as depicted by FIG. 1A, but the customer resolution engine already deleted the edges 132 and 134 when deleting the node 114 that was identified as a match key, such that the edges 132 and 134 are absent from the graph 136 depicted by FIG. 1B. When identifying the edges 128 and 130 with the weight of 1 as match keys, the customer resolution engine favors smaller cliques over larger cliques and favors lower-weight cliques over higher-weight cliques. In this example, the algorithm variable k equals 2 and the algorithm variable W equals 1. The second count is at least the first count. For example, the second count and the first count both have the value of 1.

After identifying each edge associated with a second count, each edge associated with the second count is deleted, block 210. The database system deletes each edge that was identified as a match key. By way of example and without limitation, this can include the customer resolution engine deleting the edges 128 and 130 from the graph 136 depicted by FIG. 1B. Consequently, the customer resolution engine's deletions create the graph 138 depicted by FIG. 1C. By deleting the cliques that are the edges 128 and 130 which were identified as match keys, the customer resolution engine discards all cliques that are proper supersets of the edges 128 and 130 as candidates for being match keys.

Following the creation of a graph, each node associated with a third count is identified as a third set of keys, block 212. The database system identifies each single node clique with the weight of two as a match key. In embodiments, this can include a customer resolution engine identifying the node 108 as the match key {aadams@acme.com}, the node 110 as the match key {Bob}, and the node 112 as the match key {Brown}. When identifying the nodes 108, 110, and 112 with the weight of 2 as match keys, the customer resolution engine favors smaller cliques over larger cliques and favors lower-weight cliques over higher-weight cliques. In this example, the algorithm variable k equals 1 and the algorithm variable W equals 2. The third count is at least the second count. For example, the third count equals 2 and the second count equals 1.

Having identified each node associated with a third count, each node associated with the third count is deleted, block 214. The database system deletes each one-node clique that was identified as a match key. For example, and without limitation, this can include the customer resolution engine deleting the nodes 108, 110, and 112, which also deletes the edges 122 and 124 that connect the node 108 to other nodes, and the edge 126 that connects the nodes 110 and 112, from the graph 138 depicted by FIG. 1C, thereby creating the graph 140 depicted by FIG. 1D. By deleting the cliques that are the nodes 108, 110, and 112 which were identified as match keys, the customer resolution engine discards all cliques that are proper supersets of the node 108, 110, and 112 as candidates for being match keys.

After creating a graph, each edge associated with a fourth count is identified as a fourth set of keys, block 216. The database system identifies each double node clique connected by an edge with the weight of 2 as a match key. By way of example and without limitation, this includes the customer resolution engine identifying the edge 118 that has a weight of 2 and connects the nodes 102 and 106 as the match key {Ann, 1-987-654-3210}, and the edge 120 that has a weight of 2 and connects the nodes 104 and 106 as the match key {Adams, 1-987-654-3210}. In this example, the algorithm variable k equals 2 and the algorithm variable W equals 2. The fourth count is at least the third count. For example, the fourth count equals 2 and the third count equals 2.

Following the identification of each edge associated with a fourth count, each edge associated with the fourth count is deleted, block 218. The database system deletes each two-node clique that was identified as a match key. In embodiments, this includes the customer resolution engine deleting the edges 118 and 120 from the graph 140 depicted by FIG. 1D, thereby creating the graph 142 depicted by FIG. 1E. By deleting the cliques that are the edges 118 and 120 which were identified as match keys, the customer resolution engine discards all cliques that are proper supersets of the edges 118 and 120 as candidates for being match keys.

Having created a graph, each pair of edges connected by a corresponding node and collectively associated with a fifth count are optionally identified as a fifth set of keys, block 220. The database system can identify each pair of edges that are connected by a node and that have a weight of 2 as a match key. For example, and without limitation, this could have included the customer resolution engine identifying the edges 132 and 134 that are connected by the node 114, which are a clique with the edge weights of 2, as the match key {Bob, bbrown@acme.com, Brown} if the customer resolution engine had not already deleted these edges 132 and 134 and the node 114. In this example, the algorithm variable k equals 3 and the algorithm variable W equals 2.

After identifying each pair of edges connected by a corresponding node and collectively associated with a fifth count, each pair of edges connected by the corresponding node and collectively associated with the fifth count are optionally deleted, block 222. The database system deletes each edge that was identified as a match key. By way of example and without limitation, this could have included the customer resolution engine deleting the edges 132 and 134 that are connected by the node 114, if the customer resolution engine had not already deleted these edges 132 and 134.

Following the creation of a graph, each node associated with a sixth count is optionally identified as a sixth set of keys, block 224. The database system identifies each single node clique with the weight of 3 as a match key. In embodiments, this includes a customer resolution engine identifying the node 106 that has a weight of 3 as the match key {1-987-654-3210}. In this example, the algorithm variable k equals 1 and the algorithm variable W equals 3. The sixth count is at least the fifth count. For example, the sixth count equals 3 and the fifth count equals 2.

Having identified each node associated with a sixth count, each node associated with the sixth count is optionally deleted, block 226. The database system deletes each one-node clique that was identified as a match key. For example, and without limitation, this could have included the customer resolution engine deleting the node 106 from the graph 142 depicted by FIG. 1E, thereby creating the graph 144 depicted by FIG. 1F.

Figure 1F:
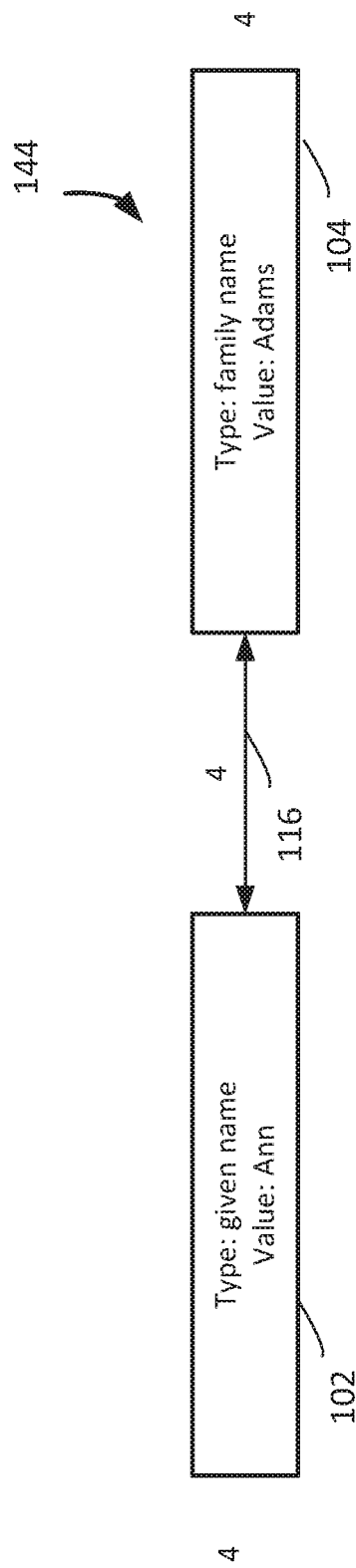

After creating a graph, each edge associated with a seventh count is optionally identified as a seventh set of keys, block 228. The database system identifies each double node clique connected by an edge with the weight of 3 as a match key. By way of example and without limitation, this could have included the customer resolution engine identifying the edge 116 that connects the nodes 102 and 104 as the match key {Ann, Adams}, as depicted by FIG. 1F, if edge 116 that connects the nodes 102 and 104 had the weight of 3. In this example, the algorithm variable k equals 2 and the algorithm variable W equals 3. The seventh count is at least the sixth count. For example, the seventh count equals 3 and the sixth count equals 3.

Following the identification of each edge associated with a seventh count, each edge associated with the seventh count is optionally deleted, block 230. The database system deletes each edge that was identified as a match key. In embodiments, this could have included the customer resolution engine deleting the edge 116 from the graph 144 depicted by FIG. 1F, if the edge 116 that connects the nodes 102 and 104 had the weight of 3.

Following the identification of each set of keys, each set of keys is used to search and match records, block 232. The database system uses the match keys to identify existing database records that match a newly received database record. In embodiments, this can include the customer resolution engine using only the match key {bbrown@acme.com} of the match keys bbrown@acme.com}, {Bob, 1-987-654-3210}, {Brown, 1-987-654-3210}, {aadams@acme.com}, {Bob}, {Brown}, {Ann, 1-987-654-3210}, {Adams, 1-987-654-3210}, {1-987-654-3210}, {Ann}, and {Adams} to efficiently search and match MegaCorp's existing records for Bob Brown when Bob Brown enters his name and email address when visiting MegaCorp's customer service website. By using the match keys in the order that the match keys were identified, the customer resolution engine favors smaller cliques over larger cliques and favors lower-weight cliques over higher-weight cliques. The customer resolution engine generates match keys that have a near-perfect recall (they almost never miss any matches) while being orders of magnitude faster than a naive approach that would deep-match all pairs of database records. A record can be the storage of at least one value in a persistent form.

The method 200 may be repeated as desired. Although this disclosure describes the blocks 202-236 executing in a particular order, the blocks 202-232 may be executed in a different order. In other implementations, each of the blocks 202-232 may also be executed in combination with other blocks and/or some blocks may be divided into a different set of blocks.

There are some scenarios when match keys need to be composed of triplets of values. For example. a database of one million person profiles receives a new record in which the first name is John, the last name is Smith, the city is San Francisco, and no other fields include any data. Before adding this record to the database, the database system will need to search the database for all records that could identify a John Smith in the city of San Francisco to determine if the new record matches any existing records. However, using any match key which includes the values from at most two fields risks returning too many results, which would have to be pruned. There may be too many John Smiths, too many Johns in the city of San Francisco, or too many Smiths in the city of San Francisco.

The attributes in a data set are denoted as 1, 2, 3, . . . n. Examples of attributes include first name, last name, phone number, and city. $Pi(u)$ denotes the probability of the attribute i storing the value u:

$$Pi(u)=n_i(u)/\Sigma_v n_i(v) \qquad \text{Equation (1)}$$

where v denotes the value of the attribute i and $n_i(v)$ denotes the number of records in the dataset which have the attribute i storing the value v. Null is specifically excluded as being a value of any attribute.

$Pij(u, v)$ denotes the probability of the attribute i storing the value u and the attribute j storing the value v:

$$Pij(u,v)=n_{ij}(u,v)/\Sigma_{p,q} n_{ij}(p,q) \qquad \text{Equation (2)}$$

where p denotes the value of the attribute i, q denotes the value of the attribute j, and $n_{ij}(p, q)$ denotes the number of records in the dataset which has the attribute i storing the value p and the attribute j storing the value q. Neither p nor q may be null.

The learned model takes the form of the probabilities specified in the Equations (1) and (2). These probabilities are used to estimate triplet probabilities, and then count estimates are obtained from the triplet probability estimates. The triplets of values that have sufficiently low estimated clique counts are deemed to form good match keys. A good match key helps retrieve a relatively lesser number of candidates for a given record than a relatively greater number of candidates that are helped retrieved by a bad match key, such as the example of the bad match key John Smith for retrieving records of a John Smith in the city of San Francisco.

Equation (2) is generalized to obtain the probability of a triplet of 3 values on 3 attributes, which could be calculated straightforwardly by explicitly computing and storing the values of all triplets. However, such triplet computations can require too much memory or execute too slowly when the data set is large, because there might be too many triplets of values. The exact computation of the probability can be relaxed to a sufficiently accurate approximation in a method that can execute much faster and can require much less memory. The method uses just the learned parameters in the Equations (1) and (2) to estimate a triplet's probability.

To simplify notation, the triplet of values is denoted as A, B, and C. $P_{ABC}$ is estimated from $P_A$, $P_B$, $P_C$, $P_{AB}$, $P_{AC}$, and $P_{BC}$. The approach is guided by the following heuristic intuition. If A, B, and C are all pairwise independent, then they are probably jointly independent. When such independence is the case, $P_{ABC}=P_A P_B P_C$. At the other extreme of dependence, A, B, and C are maximally inter-dependent when they are all the same event. When such dependence is the case, $P_{ABC}=P_A=P_B=P_C$. These two extremes of independence and dependence are summarized as:

$$P_{AB} \approx P_A P_B \text{ and } P_{BC} \approx P_B P_C \text{ and } P_{AC} \approx P_A P_C \Rightarrow P_{ABC} \approx P_A P_B P_C \quad \text{Equation (3)}$$

$$A \approx B \approx C \Rightarrow P_{ABC} \approx P_A \text{ or } P_B \text{ or } P_C \quad \text{Equation (4)}$$

Therefore, $P_{ABC}$ is in the range $[P_A P_B P_C, P_A]$. The estimate of $P_{ABC}$ may be placed towards the left extreme of independence or the right extreme of dependence, depending on how much evidence exists for the independence and the dependence expressed by the various antecedents in the Equations (3) and (4), respectively.

The next step in the method is to 'soften' the rules embodied in the Equations (3) and (4) by collapsing these rules into a single scoring function. Two events X and Y may be quantified for how different $P_{XY}$ is from $P_X P_Y$, such as by the Kullback-Leibler divergence $D(P_{XY}||P_X P_Y)$ between the actual observed joint distribution $P_{XY}$ and the distribution $P_X P_Y$ under the assumption that X and Y are independent:

$$D(P_{XY}||P_X P_Y) = -P_{XY} \log P_{XY}/P_X P_Y$$

This Kullback-Leibler divergence is zero when X and Y are truly independent, and positive when X and Y are not independent. However, the Kullback-Leibler divergence is neither symmetrical nor bounded. Both symmetry and bounding issues are resolved by using the Jensen-Shannon divergence instead, which is defined as $$JSD(P||Q) = (\tfrac{1}{2})D(P||M) + (\tfrac{1}{2})D(Q||M)$$

where $$M = (\tfrac{1}{2})(P+Q)$$

In this case, $P \equiv P_{XY}$ and $Q \equiv P_X P_Y$. The Jensen-Shannon divergence is bounded between 0 and 1 when the log to compute the Kullback-Leibler divergence uses base 2. The Jensen-Shannon divergence has the value 0 when P and Q are independent and has the value 1 when P and Q are maximally dependent. $JSD(P_{XY}||P_X P_Y)$ may be abbreviated as $JSD_{XY}$. The proposed softening of the antecedent of Equation (3) is:

$$I_{ABC} = (\tfrac{1}{3}) + (1-JSD_{AB}) + (1-JSD_{AC}) + (1-JSD_{BC}))$$

The value of this expression will be 1 when A, B, and C are all pairwise independent, and the value of this expression is 0 when A, B, and C are all the same event. Based on the range between these values, the overall estimate may be built as follows:

$$P_{ABC} \approx I_{ABC} * P_A * P_B * P_C + (1-I_{ABC}) * \min[P_A, P_B, P_C] \quad \text{Equation (5)}$$

In this use case, the estimate of $P_{ABC}$ only needs to meet the constraint that the triplets of values deemed rare by the estimate mostly overlap with the triplets of values that would have been deemed rare by the correct value of $P_{ABC}$.

In a large data set, there may be many triplets of values A, B, and C that co-occur in at least one record, but each triplet of values does not need to be scored via Equation (5). As described above in reference to the method 200 depicted in FIG. 2, first the rare singletons are found, which are 1 node cliques with low weights, then the rare pairs are found, which are 2 node cliques with low weights, which are the same as single edge cliques with low weights. The found singletons and pairs, or 1 node cliques with low weights and 2 node cliques with low weights, are identified as match keys and deleted from the graph of nodes and edges before attempting to identify triplets, which are 3 node cliques, that are good match keys. Therefore, only the triplets which are not supersets of the found singletons and pairs are evaluated as whether they are rare enough to have formed good match keys.

FIGS. 3A-J depict example graphs 300 and 385-392 that the customer resolution engine generates based on the following example database records. After Acme Corporation employee John Jones enters his name and city San Francisco while visiting MegaCorp's marketing website, the database system creates a database record that stores "John," "Jones," and "San Francisco," and stores the visit data to this database record each time that he visits the marketing website. Following John Jones entering his name and Acme Co. email address jjones@acme.com while visiting Mega-Corp's retail website, the database system creates a database record that stores "John," "Jones," and "jjones@acme.com," and stores the visit data to this database record each time that he visits the retail website. After Best Corporation employee John Jones enters his name and city San Jose while visiting MegaCorp's marketing website, the database system s creates a database record that stores "John," "Jones," and "San Jose," and stores the visit data to this database record each time that he visits the marketing website. Following John Jones entering his name and Best Co. email address jjones@best.com while visiting MegaCorp's retail website, the database system creates a database record that stores "John," "Jones," and "jjones@best.com," and stores the visit data to this record each time that he visits the retail website.

Similarly, after Compu Corporation employee John Smith enters his name and city San Francisco while visiting MegaCorp's marketing website, the database system creates a database record that stores "John," "Smith," and "San Francisco," and stores the visit data to this database record each time that he visits the marketing website. Following John Smith entering his name and Compu Co. email address jsmith@compu.com while visiting MegaCorp's retail website, the database system creates a database record that stores "John," "Smith," and "jsmith@compu.com," and stores the visit data to this database record each time that he visits the retail website. After Digi Corporation employee John Smith enters his name and city San Jose while visiting MegaCorp's marketing website, the database system creates a database record that stores "John," "Smith," and "San Jose," and stores the visit data to this database record each time that he visits the marketing website. Following John Smith entering his name and Digi Co. email address jsmith@digi.com while visiting MegaCorp's retail website, the database system creates a database record that stores "John," "Smith," and "jsmith@digi.com," and stores the visit data to this record each time that he visits the retail website.

Likewise, after Electro Corporation employee Ann Jones enters her name and city San Francisco while visiting MegaCorp's marketing website, the database system creates a database record that stores "Ann," "Jones," and "San Francisco," and stores the visit data to this database record each time that she visits the marketing website. Following Ann Jones entering her name and Electro Co. email address ajones@electro.com while visiting MegaCorp's retail website, the database system creates a database record that stores "Ann," "Jones," and "ajones@electro.com," and stores the visit data to this database record each time that she visits the retail website. After Fab Corporation employee Ann Jones enters her name and city San Jose while visiting MegaCorp's marketing website, the database system creates a database record that stores "Ann," "Jones," and "San Jose," and stores the visit data to this database record each time that she visits the marketing website. Following Ann Jones entering her name and Fab Co. email address ajones@fab.com while visiting MegaCorp's retail website, the database system creates a database record that stores "Ann," "Jones," and "ajones@fab.com," and stores the visit data to this record each time that she visits the retail website.

In a comparable manner, after Great Corporation employee Ann Smith enters her name and city San Francisco while visiting MegaCorp's marketing website, the database system creates a database record that stores "Ann," "Smith," and "San Francisco," and stores the visit data to this database record each time that she visits the marketing website. Following Ann Smith entering her name and Great Co. email address asmith@great.com while visiting MegaCorp's retail website, the database system creates a database record that stores "Ann," "Smith," and "asmith@great.com," and stores the visit data to this database record each time that she visits the retail website. After Hyper Corporation employee Ann Smith enters her name and city San Jose while visiting MegaCorp's marketing website, the database system creates a database record that stores "Ann," "Smith," and "San Jose," and stores the visit data to this database record each time that she visits the marketing website. Following Ann Smith entering her name and Hyper Co. email address asmith@hyper.com while visiting MegaCorp's retail website, the database system creates a database record that stores "Ann," "Smith," and "asmith@hyper.com," and stores visit data to this record each time that she visits the retail website.

Continuing this example, the customer resolution engine generates the graph 300 based on the database records described above, as depicted by FIG. 3A. The graph 300 includes nodes representing attribute values and edges connecting the nodes, with each edge representing a number of instances that one connected node's attribute value is associated with the other connected node's attribute value. For example, the graph 300 includes the city node 302 that represents the attribute value "San Francisco," the city node 304 that represents the attribute value "San Jose," the given name node 306 that represents the attribute value "John," the given name node 308 that represents the attribute value "Ann," the family name node 310 that represents the attribute value "Jones," and the family name node 312 that represents the attribute value "Smith." This simplified graph 300 depicts only two city nodes 302-304 for only two different city attribute values, only two given name nodes 306-308 for only two different given name attribute values, and only two family name nodes 310-312 for only two different given name attribute values. However, the graph may include any number of city nodes for any number of different city attribute values (such as 10,000 different cities), any number of given name nodes for any number of different given name attribute values (such as 1,000,000 different first names) and any number of family name nodes for any number of different family name attribute values (such as 500,000 different last names). The graph 300 also includes the email address node 314 that represents the attribute value "jjones@acme.com," the email address node 316 that represents the attribute value "jjones@best.com," the email address node 318 that represents the attribute values "jsmith@compu.com," and the email address node 320 that represents the attribute values "jsmith@digi.com." The graph 300 further includes the email address node 322 that represents the attribute values "ajones@electro.com," the email address node 324 that represents the attribute values "ajones@fab.com," the email address node 326 that represents the attribute values "asmith@great.com," and the email address node 328 that represents the attribute values "asmith@hyper.com."

The weight of (1,100) for the node 302 represents the 1,100 instances that "San Francisco" is stored by the database records, and the weight of (900) for the node 304 represents the 900 instances that "San Jose" is stored by the database records. Likewise, the weight of (1,500) for the node 306 represents the 1,500 instances that "John" is stored by the database records, the weight of (500) for the node 308 represents the 500 instances that "Ann" is stored by the database records. Similarly, the weight of (800) for the node 310 represents the 800 instances that "Jones" is stored by the database records, and the weight of (1,200) for the node 312 represents the 1,200 instances that "Smith" is stored by the database records. Furthermore, the weight of (60) for the node 314 represents the 60 instances that "jjones@acme.com" is stored by the database records, the weight of (50) for the node 316 represents the 50 instances that "jjones@best.com" is stored by the database records, the weight of (80) for the node 318 represents the 80 instances that "jsmith@compu.com" is stored by the database records, and the weight of (70) for the node 320 represents the 70 instances that "jsmith@digi.com" is stored by the database records. Additionally, the weight of (20) for the node 322 represents the 20 instances that "ajones@electro.com" is stored by the database records, the weight of (10) for the node 324 represents the 10 instances that "ajones@fab.com" is stored by the database records, the weight of (40) for the node 326 represents the 40 instances that "asmith@great.com" is stored by the database records, and the weight of (30) for the node 328 represents the 30 instances that "asmith@h.com" is stored by the database records.

The edge 330 connects the nodes 302 and 306, and has a weight of (800) that represents the 800 instances of "San Francisco" and "John" being stored together in the database records; and the edge 332 connects the nodes 302 and 308, and has a weight of (300) that represents the 300 instances of "San Francisco" and "Ann" being stored together in the database records. Likewise, the edge 334 connects the nodes 302 and 310, and has a weight of (400) that represents the 400 instances of "San Francisco" and "Jones" being stored together in the database records, and the edge 336 connects the nodes 302 and 312, and has a weight of (700) that represents the 700 instances of "San Francisco" and "Smith" being stored together in the database records. Additionally, the edge 338 connects the nodes 304 and 306, and has a weight of (700) that represents the 700 instances of "San Jose" and "John" being stored together in the database records; and the edge 340 connects the nodes 304 and 308, and has a weight of (200) that represents the 200 instances of "San Jose" and "Ann" being stored together in the database records. Likewise, the edge 342 connects the nodes 304 and 310, and has a weight of (400) that represents the 400 instances of "San Jose" and "Jones" being stored together in the database records, and the edge 344 connects the nodes 304 and 312, and has a weight of (500) that represents the 500 instances of "San Jose" and "Smith" being stored together in the database records.

Furthermore, the edge 346 connects the nodes 306 and 310, and has a weight of (600) that represents the 600 instances of "John" and "Jones" being stored together in the database records; and the edge 348 connects the nodes 306 and 312, and has a weight of (900) that represents the 900 instances of "John" and "Smith" being stored together in the database records. Likewise, the edge 350 connects the nodes 308 and 310, and has a weight of (200) that represents the 200 instances of "Ann" and "Jones" being stored together in the database records, and the edge 352 connects the nodes 308 and 312, and has a weight of (300) that represents the 300 instances of "Ann" and "Smith" being stored together in the database records.

The edge 354 connects the nodes 306 and 314, and has a weight of (60) that represents the 60 instances of "John" and "jjones@acme.com" being stored together in the database records; and the edge 356 connects the nodes 310 and 314, and has a weight of (60) that represents the 60 instances of "Jones" and "jjones@acme.com" being stored together in the database records. Additionally, the edge 358 connects the nodes 306 and 316, and has a weight of (50) that represents the 50 instances of "John" and "jjones@best.com" being stored together in the database records; and the edge 360 connects the nodes 310 and 316, and has a weight of (50) that represents the 50 instances of "Jones" and "jjones@best.com" being stored together in the database records. Similarly, the edge 362 connects the nodes 306 and 318, and has a weight of (80) that represents the 80 instances of "John" and "jsmith@compu.com" being stored together in the database records; and the edge 364 connects the nodes 312 and 318, and has a weight of (80) that represents the 80 instances of "Smith" and "jsmith@compu.com" being stored together in the database records. Additionally, the edge 366 connects the nodes 306 and 320, and has a weight of (70) that represents the 70 instances of "John" and "jsmith@digi.com" being stored together in the database records; and the edge 368 connects the nodes 312 and 320, and has a weight of (70) that represents the 70 instances of "Smith" and "jsmith@digi.com" being stored together in the database records.

Likewise, the edge 370 connects the nodes 308 and 322, and has a weight of (20) that represents the 20 instances of "Ann" and "ajones@electro.com" being stored together in the database records; and the edge 372 connects the nodes 310 and 322, and has a weight of (20) that represents the 20 instances of "Jones" and "ajones@electro.com" being stored together in the database records. Additionally, the edge 374 connects the nodes 308 and 324, and has a weight of (10) that represents the 10 instances of "Ann" and "ajones@fab.com" being stored together in the database records; and the edge 376 connects the nodes 310 and 324, and has a weight of (10) that represents the 10 instances of "Jones" and "ajones@fab.com" being stored together in the database records. In a comparable way, the edge 378 connects the nodes 308 and 326, and has a weight of (40) that represents the 40 instances of "Ann" and "asmith@great.com" being stored together in the database records; and the edge 380 connects the nodes 312 and 326, and has a weight of (40) that represents the 40 instances of "Smith" and "asmith@great.com" being stored together in the database records. Additionally, the edge 382 connects the nodes 308 and 328, and has a weight of (30) that represents the 30 instances of "Ann" and "amith@hyper.com" being stored together in the database records; and the edge 384 connects the nodes 312 and 328, and has a weight of (30) that represents the 30 instances of "Smith" and "asmith@hyper.com" being stored together in the database records. Although the graph 300 depicts nodes, edges, and weights for only four attributes (city, given name, family name, and email address) based on only 2,000 database records, the customer resolution engine can generate a graph that depicts any numbers of nodes, edges, and weights for any number of attributes based on any number of database records.

Clustering analysis may be run on the graph to discover clusters of nodes which may be grouped together as a clique. These nodes can further be refined and analyzed to distill a master profile, which may be referred to as an entity 360 view, that can then be used for a number of business use cases. Any attribute value may be shared by multiple cliques. However, sharing, in general, is constrained to fairly tight social groups, such as a household, a company, roommates, etc. Since the main use case is to connect an attribute value to a small number of master profiles, any attribute value that has a high number of edges may be handled differently, such as by being removed from the graph. Consequently, the graph is a collection of many smaller cliques.

The graph may be an undirected, weighted, and colored data structure. The graph may be "undirected" because there is no directionality of the edges that represent relationships. All that is known is that attribute value A is connected to attribute value B, such as the given name "John" is connected to the family name "Smith." The graph may be "weighted" because some relationships between attribute values are stronger than other relationships between attribute values. For example, if the same email address and the same phone number are connected together by data from multiple sources, instead of adding multiple edges, the weight of the edge connecting the phone number and the email address is incremented. This weighting provides useful meta data for clustering algorithms. The graph may be "colored" because not all edges may be the same, as different edges may represent different types of relationships. For example, one edge may represent a business relationship, such as an edge that connects a customer's name to the customer's business email address, and another edge may represent a personal relationship, such as an edge that connects the customer's name to the customer's personal email address. Colored edges represent useful metadata for clustering and for constructing master profiles.

Since a set of one or more nodes represents a set of attributes taking on unique values from their value sets, the customer resolution engine generates each match key from a corresponding set of one or more nodes that forms a corresponding clique. The clique constraint increases the likelihood that the values go together, such that the values are not mutually incompatible. Generally speaking, the customer resolution engine favors smaller cliques over larger cliques because the smaller the clique, the fewer the attributes whose values are constrained, hence the higher its recall, which is the number of records found by a lookup on a match key. Since the data in a database record is often sparse, such that only a few values may be stored by the database record, the customer resolution engine may have no choice but to use small cliques as match keys. The customer resolution engine favors using lower-weight cliques, which is similar to "cherry-picking," over higher-weight cliques because using higher-weight cliques risks having too many records, which is not performant.

Once the customer resolution engine had identified a specific clique to be a match key, the customer resolution engine will discard all cliques that are proper supersets of the identified clique as candidates for being match keys because proper supersets of good match keys are redundant. A clique that has already been identified as a match key meets the necessary condition, such that a super set key can only have lower recall.

The customer resolution engine's algorithm inputs a support parameter W:
G=n-partite graph with node and edge weights.
A: for k=1 to n do // or stop before reaching n
Identify in G all k-node cliques of weight at most W
Delete the node of any identified single node clique from G
Delete one edge of any identified multiple node cliques from G.
If G is not empty, increase W and return to A.

Figure 3A:
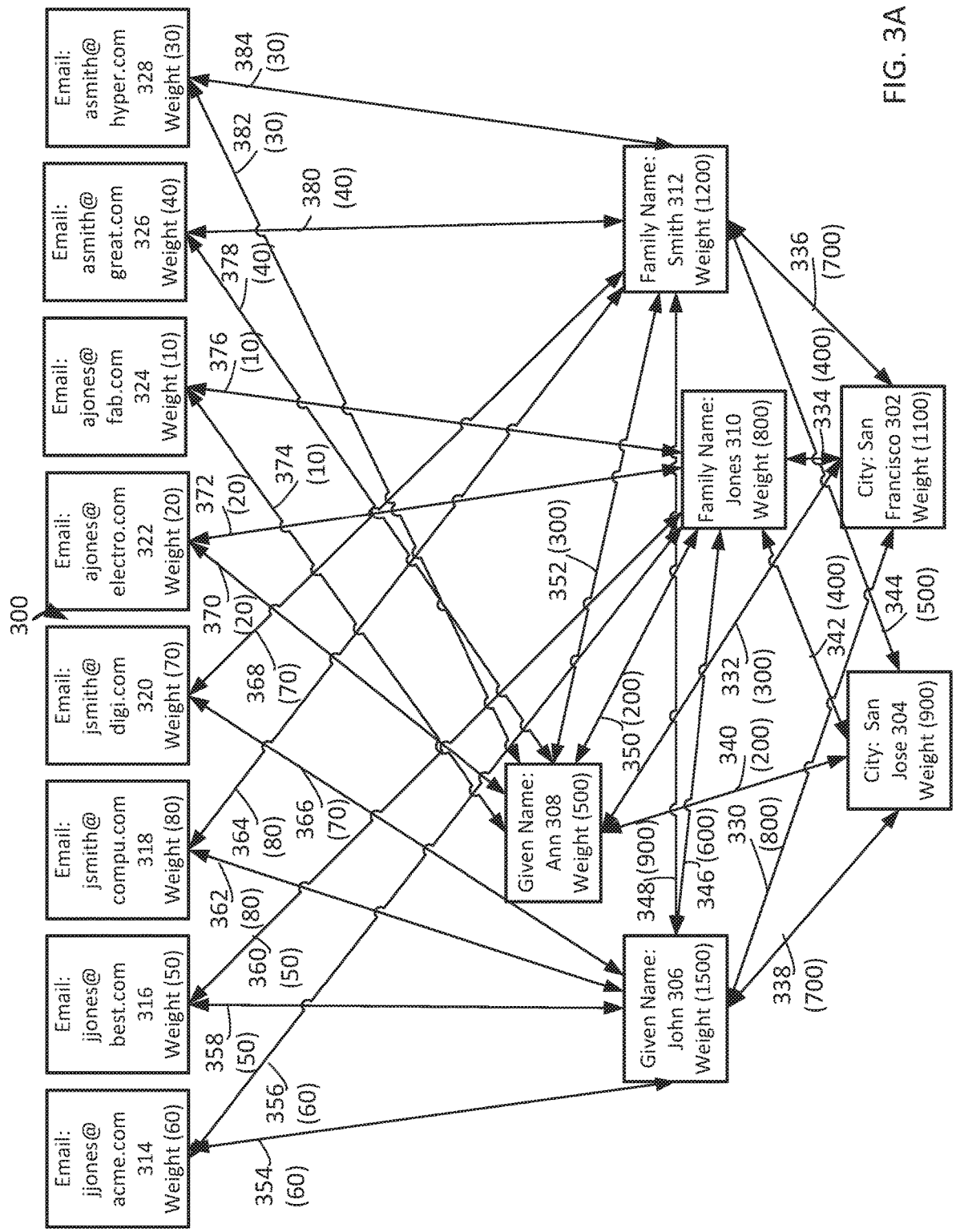
Figure 4:
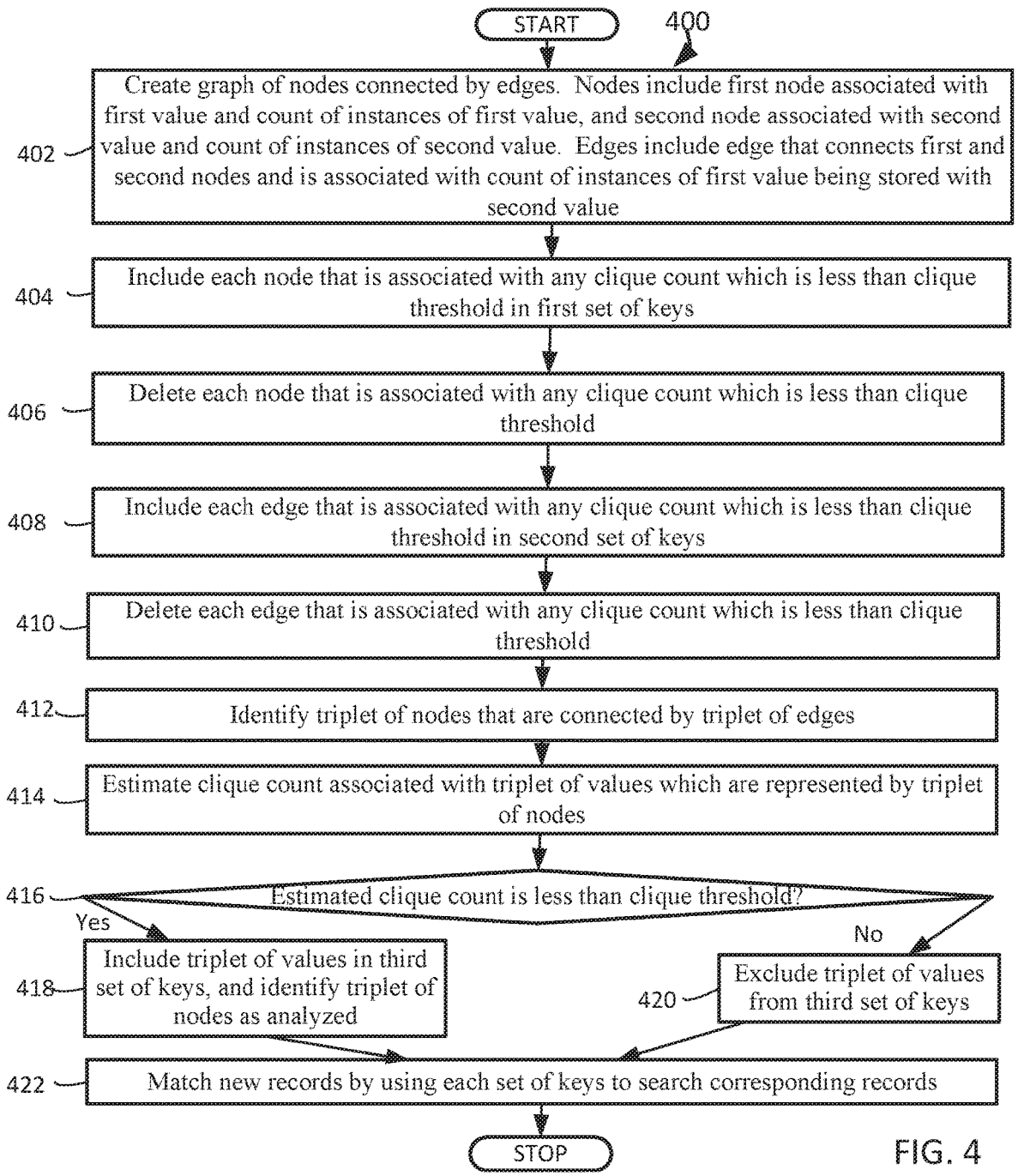
FIG. 4 is an operational flow diagram illustrating a high-level overview of a method for generating adaptive match keys based on estimating counts, in an embodiment.

FIG. 4 is an operational flow diagram illustrating a high-level overview of a method 400 for generating adaptive match keys based on estimating counts. A graph is created of nodes connected by edges, the nodes include: i) a first node associated with a first value and a count of the first value, and ii) a second node associated with a second value and a count of the second value, the edges include an edge that connects the first and second nodes and is associated with a count of instances of the first value being stored with the second value, block 402. The database system creates a graph of cliques, some of which will be identified as good match keys. For example, and without limitation, this can include a customer resolution engine generating the graph 300 depicted by FIG. 3A, based on the database records described above, which were created after 8 different corporations' employees named John Jones, John Smith, Ann Jones, and Ann Smith entered their names and either their city or their email address during 2,000 occasions when they visited MegaCorp's marketing website or retail website. In the following examples, the graph 300 is a 4-partite graph because the graph 300 represents values for the 4 attributes: city, given name, family name, and email address, such that the algorithm variable n equals 4.

After creating a graph, each node that is associated with any clique count which is less than a clique threshold is included in a first set of good match keys, block 404. The database system identifies each single node clique with a sufficiently low weight as a good match key. By way of example and without limitation, this can include the customer resolution engine incrementing the algorithm weight W from 1 to 11, and identifying the node 324 with the weight of 10 as the match key {ajones@fab.com} because the clique weight of 10 for the node 324 is less than the clique threshold of 11, which is the algorithm weight W. When identifying the node 324 with the weight of 10 as a good match key, the customer resolution engine favors smaller cliques over larger cliques and favors lower-weight cliques over higher-weight cliques. In this example, the algorithm variable k equals 1 and the algorithm variable W equals 11. A clique count can be an arithmetical value, expressed by a word, symbol, or figure, representing a particular quantity, used in making calculations, and associated with a set of one or more nodes where each pair of nodes is connected by an edge. A clique threshold can be the magnitude that must be met for a certain result to occur, which is associated with a set of one or more nodes where each pair of nodes is connected by an edge.

Having included each node that is associated with any clique count which is less than a clique threshold in the first set of good match keys, each node that is associated with any clique count which is less than the clique threshold is deleted, block 406. The database system deletes each one-node clique that was identified as a good match key. In embodiments, this can include the customer resolution engine deleting the node 324, which also deletes the edges 374 and 376 that connect the node 324 to other nodes, from the graph 300 depicted by FIG. 3A, thereby creating the graph 385 depicted by FIG. 3B. By deleting the clique that is the node 324 which was identified as a good match key, the customer resolution engine discards all cliques that are proper supersets of the node 324 as candidates for being good match keys.

Following the creation of a graph, each edge that is associated with any clique count which is less than the clique threshold is included in a second set of good match keys, block 408. The database system identifies each double node clique connected by an edge with a sufficiently low weight as a good match key. For example, and without limitation, this would have included the customer resolution engine identifying the edges 374 and 376 that have the weights of 10 as good match keys, as depicted by FIG. 3A, but the customer resolution engine already deleted the edges 374 and 376 when deleting the node 324 that was identified as a good match key, such that the edges 374 and 376 are absent from the graph 385 depicted by FIG. 3B. In this example, the algorithm variable k equals 2 and the algorithm variable W equals 11.

After including each edge that is associated with any clique count which is less than the clique threshold in a second set of good match keys, each edge that is associated with any clique count which is less than the clique threshold is deleted, block 410. The database system deletes each edge that was identified as a good match key. By way of example and without limitation, this would have included the customer resolution engine deleting the edges 374 and 376 from the graph 385 depicted by FIG. 3B, but the customer resolution engine already deleted the edges 374 and 376 when deleting the node 324 that was identified as a good match key, such that the edges 374 and 376 are absent from the graph 385 depicted by FIG. 3B. By deleting the cliques that are the edges 374 and 376 which were identified as good match keys, the customer resolution engine discarded all cliques that are proper supersets of the edges 374 and 376 as candidates for being good match keys.

Next, the customer resolution engine would include each triplet of nodes that is associated with any clique count which is less than the clique threshold in a third set of good match keys, but the lowest remaining clique count for a 3 nodes clique is estimated to be more than the current clique threshold of 11. The lowest remaining clique count for a 3 nodes clique is estimated based on the count of 500 for the node 308 for Ann, the count of 800 for the node 310 for Jones, the count of 20 for the node 322 for ajones@electro.com, the count of 200 for the edge 350 that connects the nodes 308 and 310, the count of 20 for the edge 370 that connects the nodes 308 and 322, and the count of 20 for the edge 372 that connects the nodes 310 and 322. Estimating the clique count for a 3 nodes clique is described below in reference to block 414. The customer resolution engine would not attempt to include each quadruplet nodes that are associated with any clique count which is less than the clique threshold in a fourth set of good match keys because the graph 300 represents values for the 4 attributes: city, given name, family name, and email address, such that the algorithm variable n equals 4, which limits the identification of good match keys to one node cliques, two node cliques, and three node cliques.

When including each node that has a clique count which is less than the clique threshold in the first set of good match keys, a first clique count may be less than the original clique threshold while a second clique count may be greater than the original clique threshold. The customer resolution engine can incrementally increase the clique threshold until both the first clique count and the second clique count are less than the increased clique threshold. Therefore, the customer resolution engine can include each node that has the first clique count in the first set of good match keys, and include each node that has the second clique count in the first set of good match keys, Consequently, deleting each node that has a clique count which is less than the clique threshold may include deleting each node that has the first clique count and then deleting each node that has the second clique count.

Similarly, when including each edge that has a clique count which is less than the clique threshold in the second set of good match keys, a first clique count may be less than the original clique threshold while a second clique count may be greater than the original clique threshold. The customer resolution engine can incrementally increase the clique threshold until both this first clique count and this second clique count are less than the increased clique threshold. Therefore, the customer resolution engine can include each edge that has the first clique count in the second set of good match keys, and include each edge that has the second clique count in of the second set of good match keys, Consequently, deleting each edge that has a clique count which is less than the clique threshold may include deleting each edge that has the first clique count and then deleting each edge that has the second clique count.

Figure 3B:
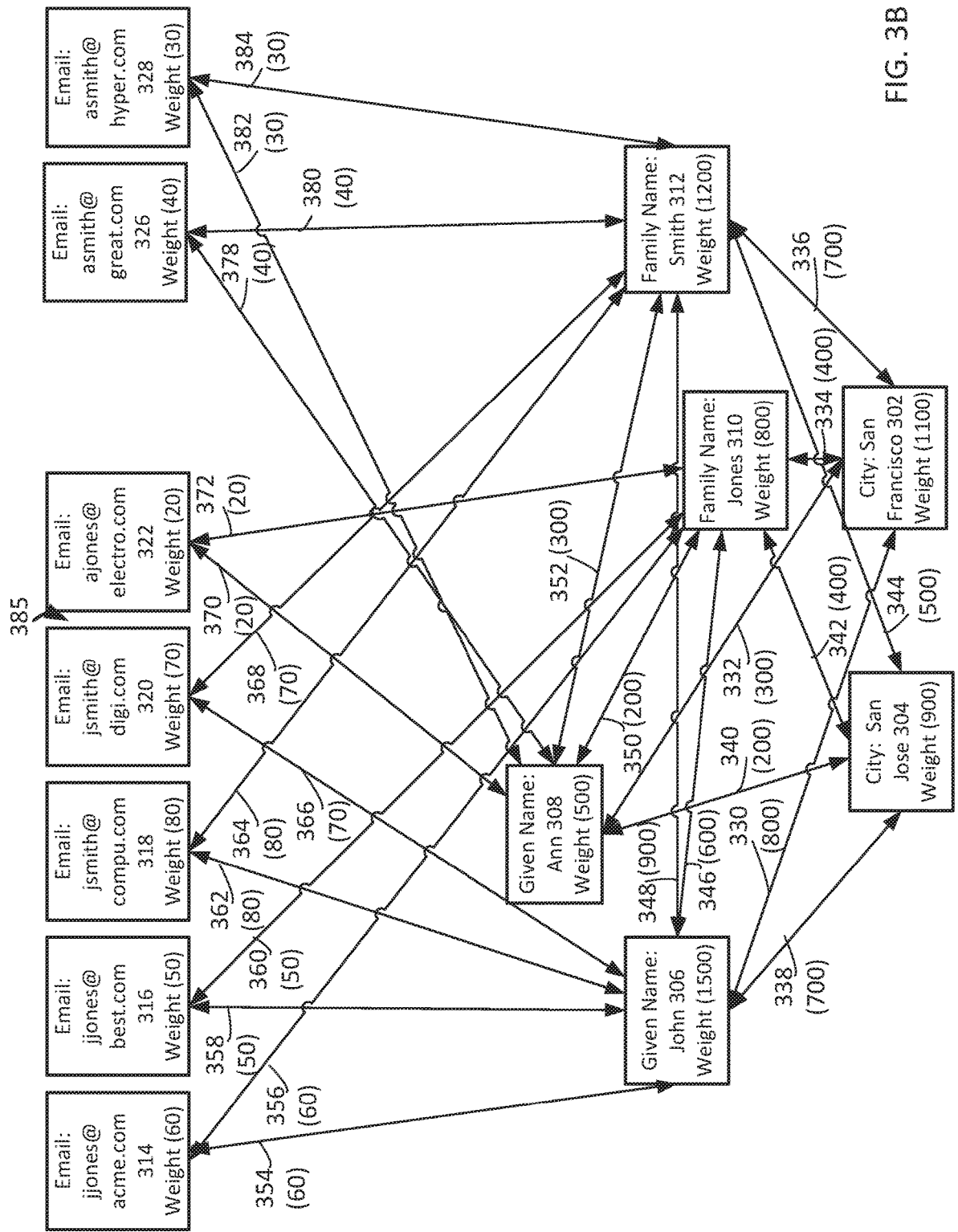

The example above describes that when the customer resolution engine increments the algorithm variable W from 1 to 11, then the clique threshold equals 11, and the node 324 has the clique count of 10 which is now less than the clique threshold of 11, such that the customer resolution engine identifies the node 324 as the email address key ajones@fab.com, and deletes the node 324, which deletes the edges 374 and 376 that connect to the node 324 in the graph 385, as depicted by FIG. 3B. Since the customer resolution engine can incrementally increase the clique threshold, the customer resolution engine can include every node that has a clique count which is less than the increased clique threshold in the first set of good match keys and include every edge that has a clique count which is less than the increased clique threshold in the second set of good match keys.

Figure 3C:
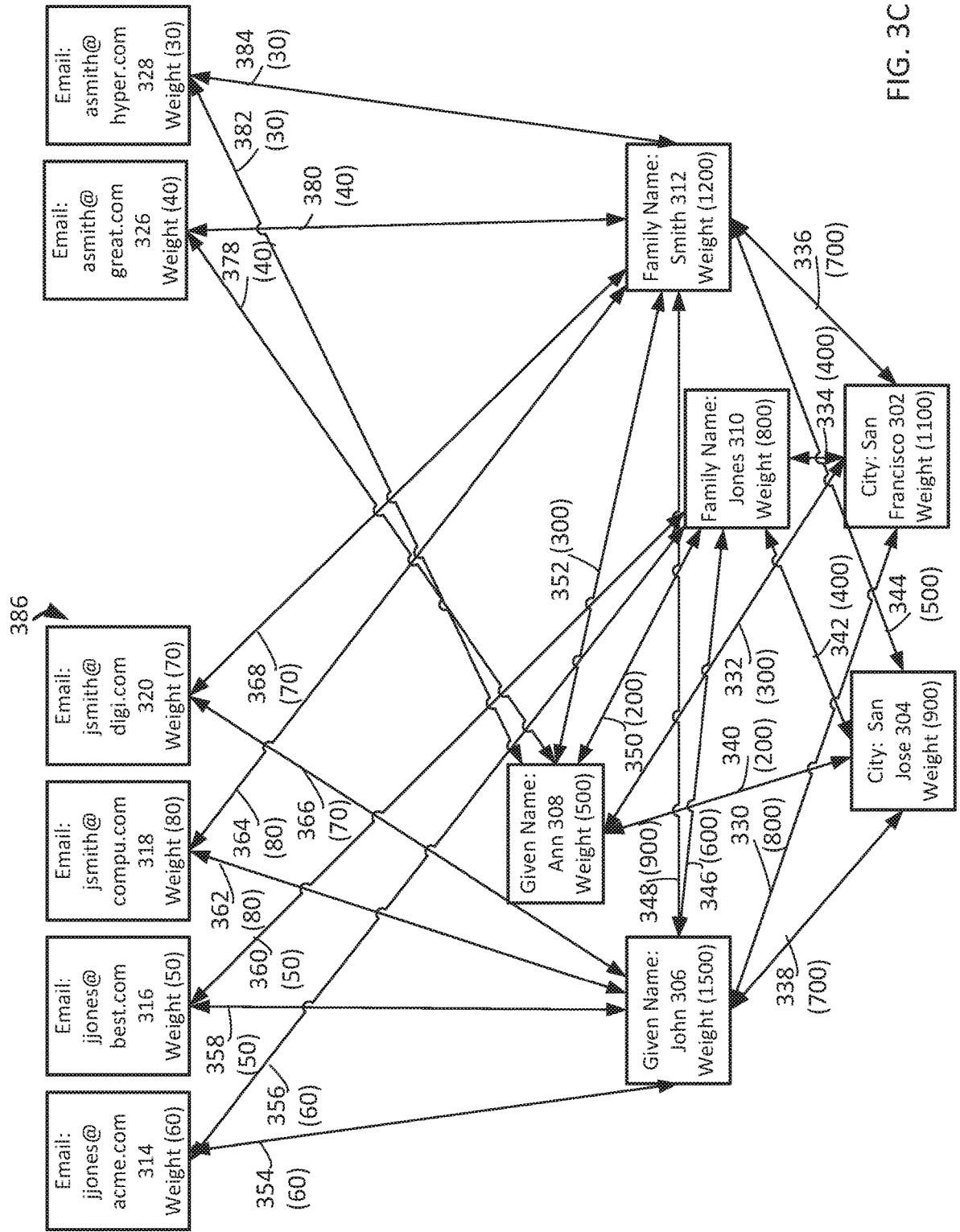

For example, when the customer resolution engine subsequently increments the algorithm variable W from 11 to 21, then the clique threshold equals 21, and the node 322 has a clique count of 20, which is now less than the clique threshold of 21, such that the customer resolution engine identifies the node 322 as a good match key for email addresses, and deletes the node 322, which deletes the edges 370 and 372 that connect to the node 322 in the graph 386, as depicted by FIG. 3C. Since the edges 370 and 372 each have a weight of 20 that is less than the clique threshold of 21, the customer resolution engine would have identified the edges 370 and 372 as good match keys and then deleted the edges 370 and 372 from the graph 386 depicted by FIG. 3C, but the customer resolution engine already deleted the edges 370 and 372 when deleting the node 324 that was identified as a good match key, such that the edges 370 and 372 are absent from the graph 386 depicted by FIG. 3C. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 21. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 386.

Figure 3D:
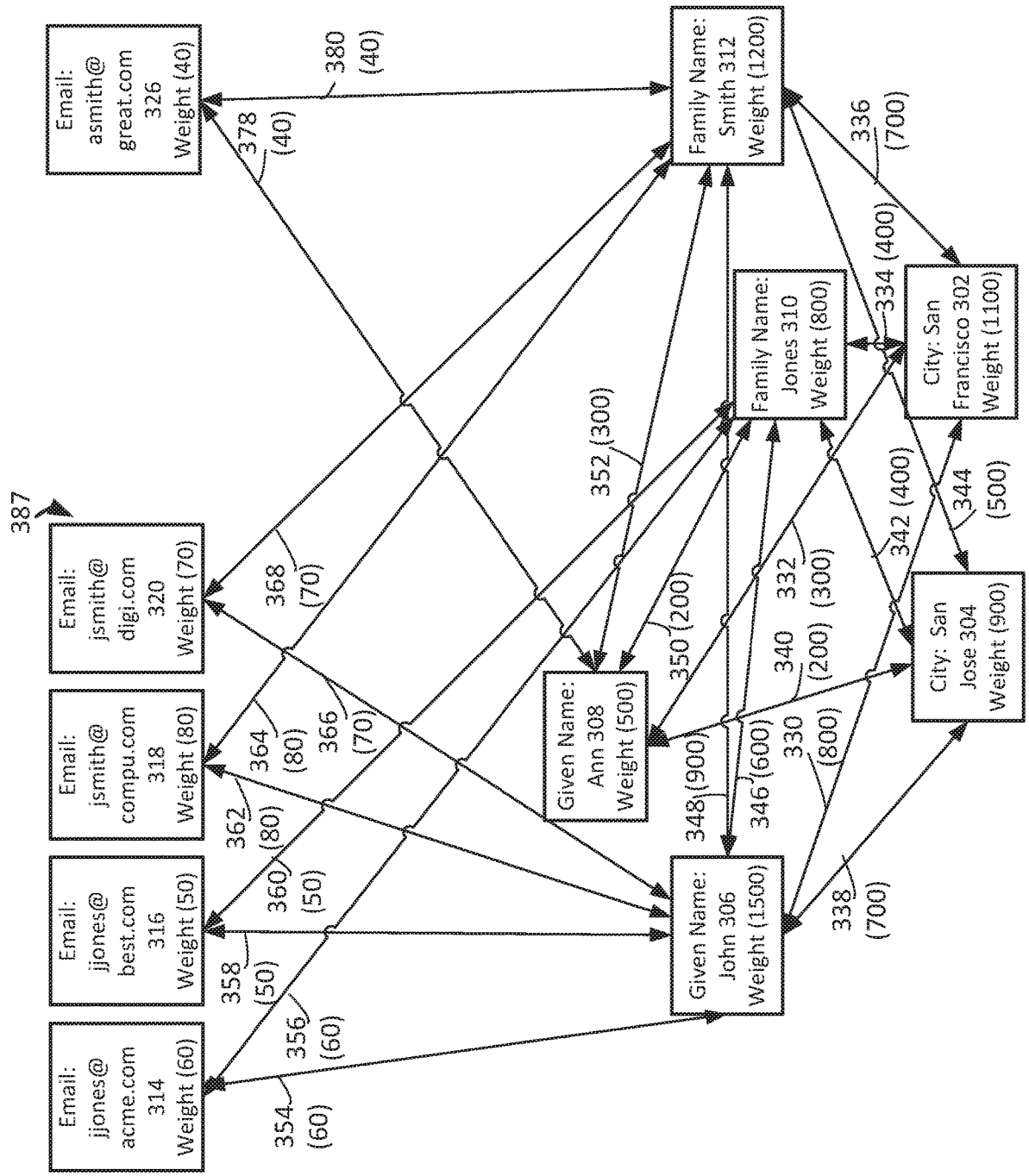

In another example, when the customer resolution engine subsequently increments the algorithm variable W from 21 to 31, then the clique threshold equals 31, and the node 328 has a clique count of 30, which is now less than the clique threshold of 31, such that the customer resolution engine identifies the node 328 as a good match key for email addresses, and deletes the node 328, which deletes the edges 382 and 384 that connect to the node 328 in the graph 387, as depicted by FIG. 3D. Since the edges 382 and 384 each have a weight of 30 that is less than the clique threshold of 31, the customer resolution engine would have identified the edges 382 and 384 as good match keys and then deleted the edges 382 and 384 from the graph 387 depicted by FIG. 3D, but the customer resolution engine already deleted the edges 382 and 384 when deleting the node 328 that was identified as a good match key, such that the edges 382 and 384 are absent from the graph 387 depicted by FIG. 3D. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 31. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 387.

Figure 3E:
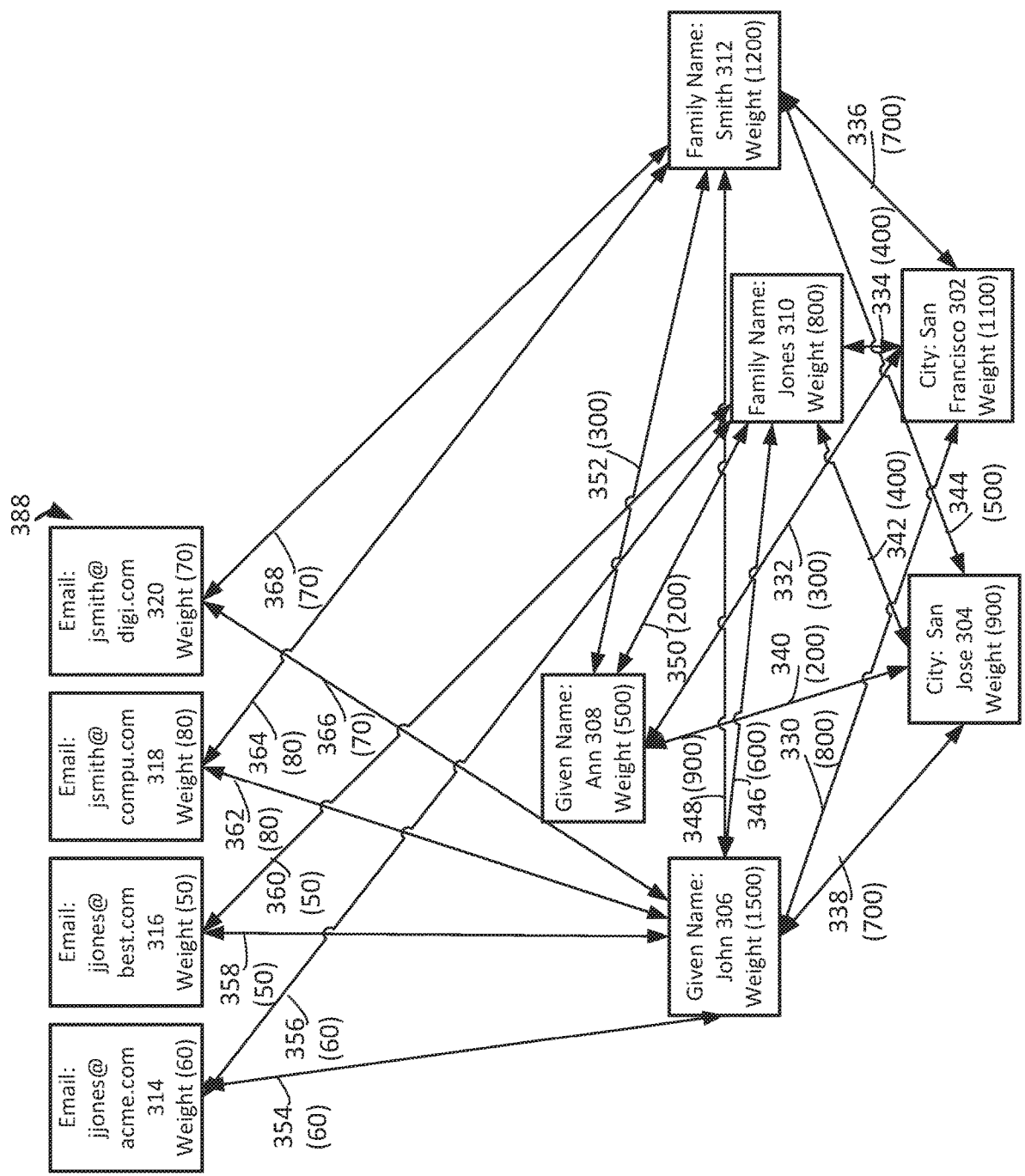

In an additional example, when the customer resolution engine subsequently increments the algorithm variable W from 31 to 41, then the clique threshold equals 41, and the node 326 has a clique count of 40, which is now less than the clique threshold of 41, such that the customer resolution engine identifies the node 326 as a good match key for email addresses, and deletes the node 326, which deletes the edges 378 and 380 that connect to the node 326 in the graph 388, as depicted by FIG. 3E. Since the edges 378 and 380 each have a weight of 40 that is less than the clique threshold of 41, the customer resolution engine would have identified the edges 378 and 380 as good match keys and then deleted the edges 378 and 380 from the graph 388 depicted by FIG. 3E, but the customer resolution engine already deleted the edges 378 and 380 when deleting the node 326 that was identified as a good match key, such that the edges 378 and 380 are absent from the graph 388 depicted by FIG. 3E. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 41. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 388.

Figure 3F:
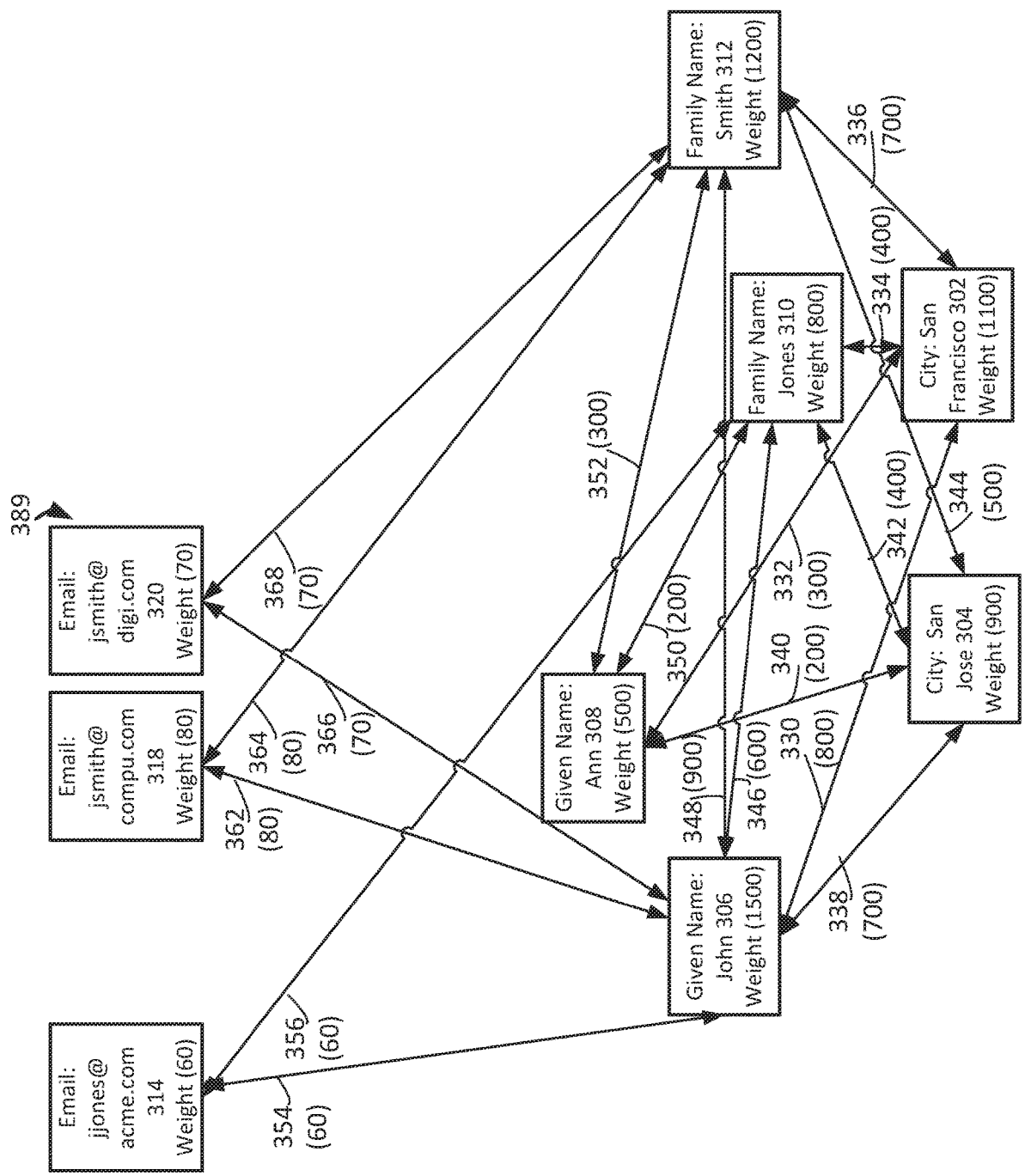

In a further example, when the customer resolution engine subsequently increments the algorithm variable W from 41 to 51, then the clique threshold equals 51, and the node 316 has a clique count of 50, which is now less than the clique threshold of 51, such that the customer resolution engine identifies the node 316 as a good match key for email addresses, and deletes the node 316, which deletes the edges 358 and 360 that connect to the node 316 in the graph 389, as depicted by FIG. 3F. Since the edges 358 and 360 each have a weight of 50 that is less than the clique threshold of 51, the customer resolution engine would have identified the edges 358 and 360 as good match keys and then deleted the edges 358 and 360 from the graph 389 depicted by FIG. 3F, but the customer resolution engine already deleted the edges 358 and 360 when deleting the node 316 that was identified as a good match key, such that the edges 358 and 360 are absent from the graph 389 depicted by FIG. 3F. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 51. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 389.

Figure 3G:
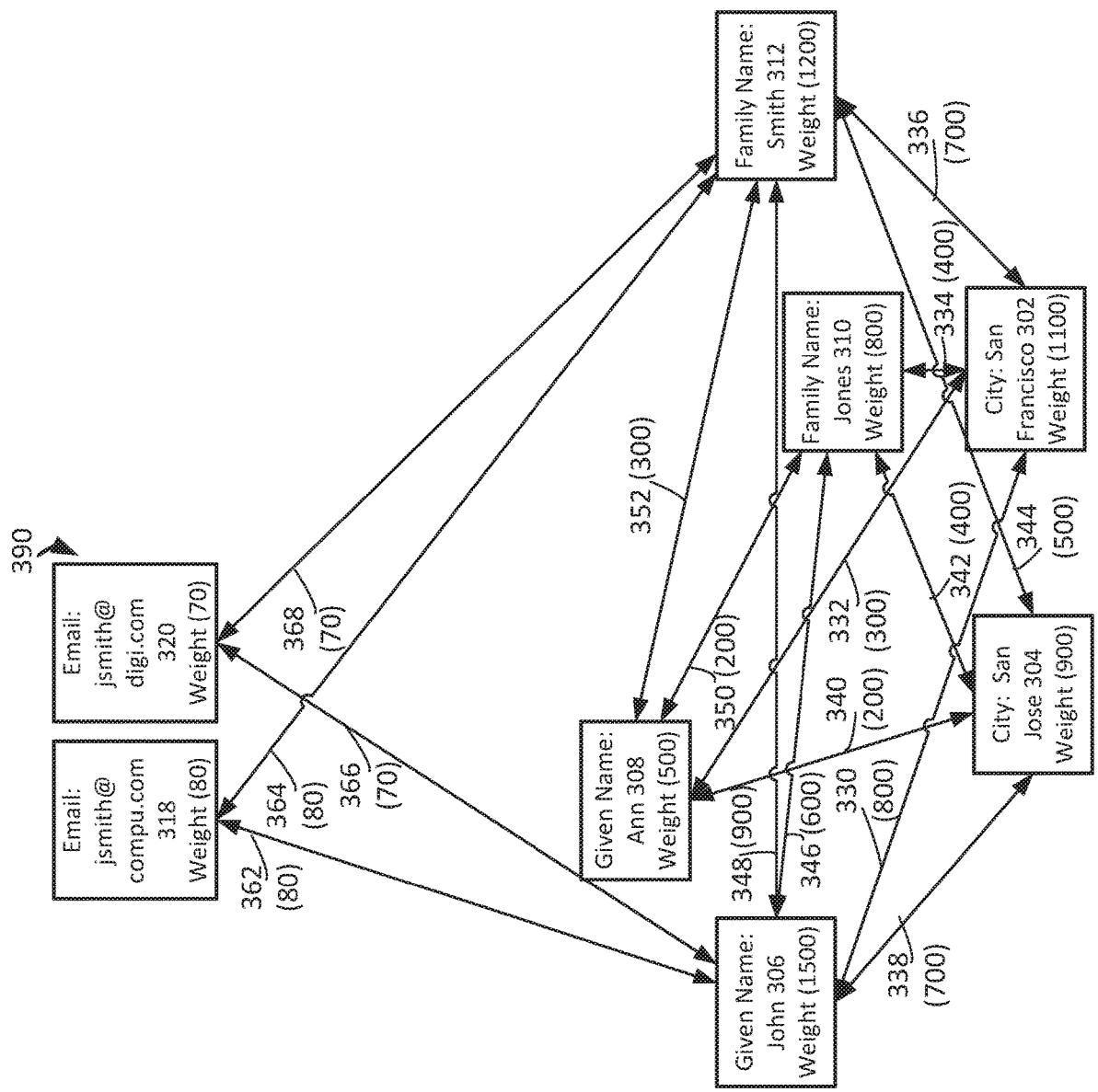

In yet another example, when the customer resolution engine subsequently increments the algorithm variable W from 51 to 61, then the clique threshold equals 61, and the node 314 has a clique count of 60, which is now less than the clique threshold of 61, such that the customer resolution engine identifies the node 314 as a good match key for email addresses, and deletes the node 314, which deletes the edges 354 and 356 that connect to the node 314 in the graph 390, as depicted by FIG. 3G. Since the edges 354 and 356 each have a weight of 60 that is less than the clique threshold of 61, the customer resolution engine would have identified the edges 354 and 356 as good match keys and then deleted the edges 354 and 356 from the graph 390 depicted by FIG. 3G, but the customer resolution engine already deleted the edges 354 and 356 when deleting the node 314 that was identified as a good match key, such that the edges 354 and 356 are absent from the graph 390 depicted by FIG. 3G. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 61. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 390.

Figure 3H:
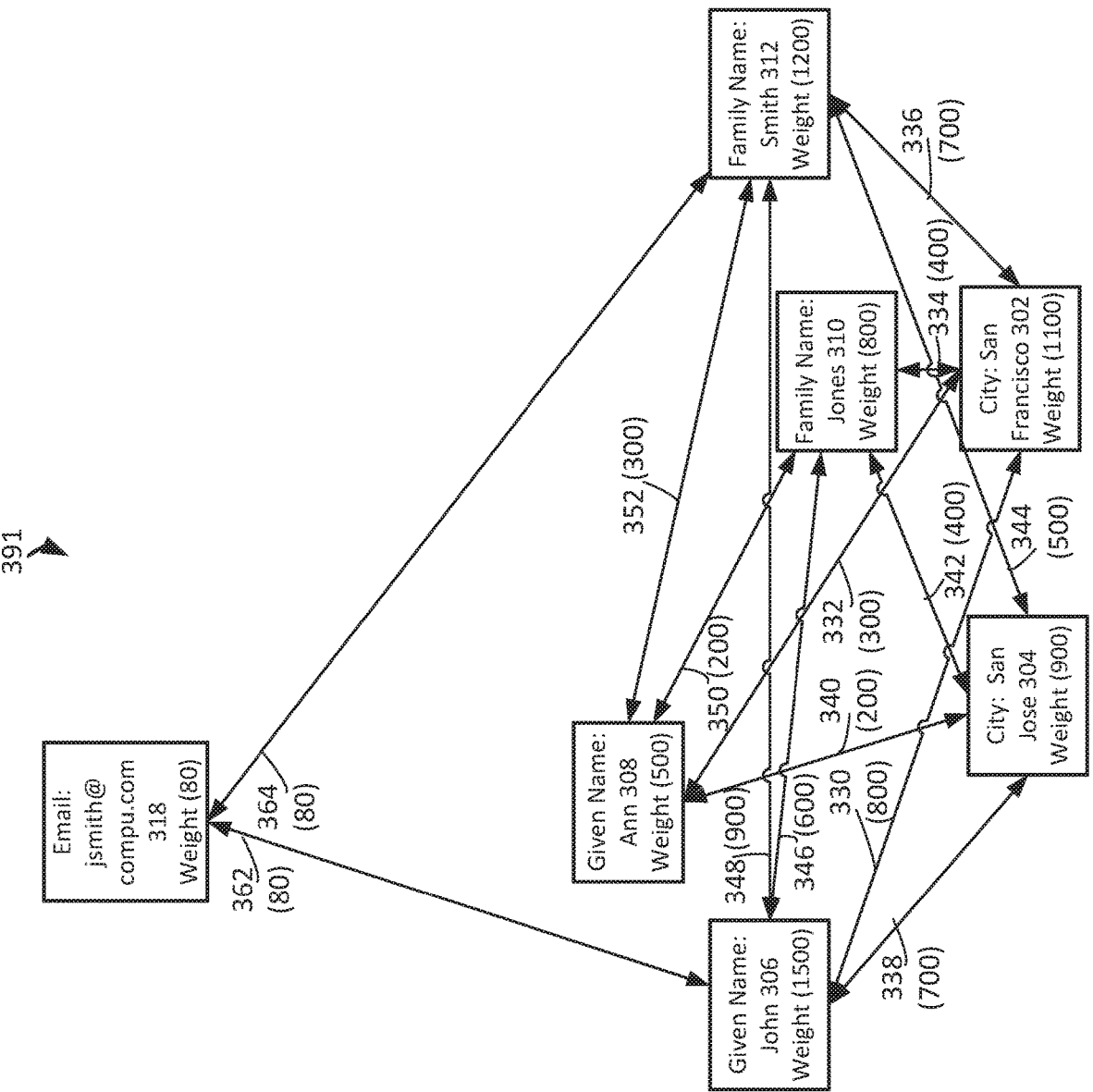
Figure 31:
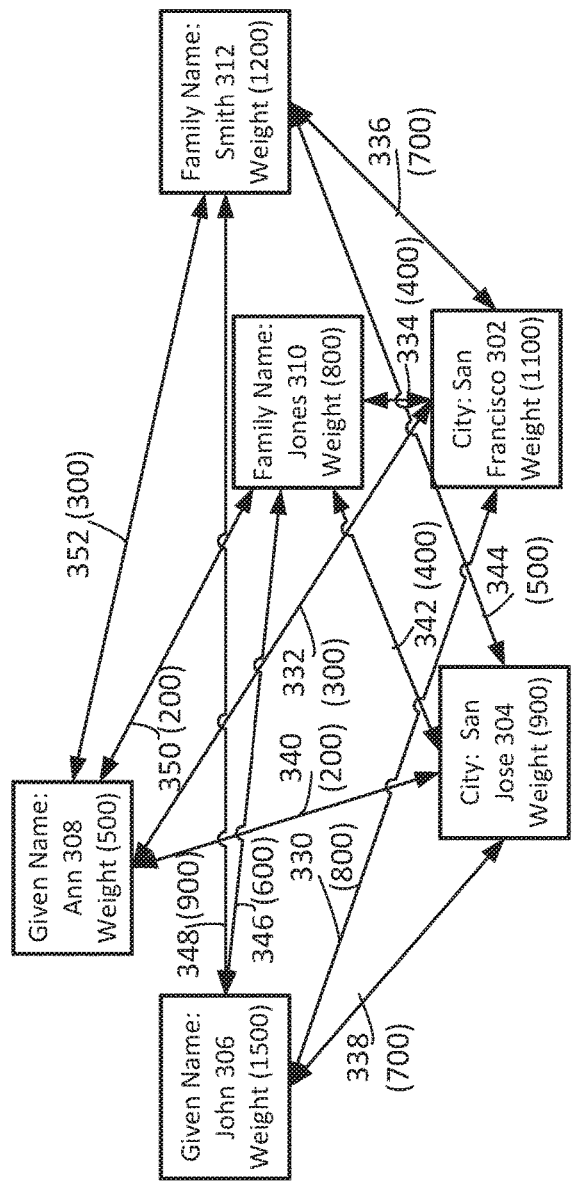

In still another example, when the customer resolution engine subsequently increments the algorithm variable W from 61 to 71, then the clique threshold equals 71, and the node 320 has a clique count of 70, which is now less than the clique threshold of 71, such that the customer resolution engine identifies the node 320 as a good match key for email addresses, and deletes the node 320, which deletes the edges 366 and 368 that connect to the node 320 in the graph 391, as depicted by FIG. 3H. Since the edges 366 and 368 each have a weight of 70 that is less than the clique threshold of 71, the customer resolution engine would have identified the edges 366 and 368 as good match keys and then deleted the edges 366 and 368 from the graph 391 depicted by FIG. 3H, but the customer resolution engine already deleted the edges 366 and 368 when deleting the node 320 that was identified as a good match key, such that the edges 366 and 368 are absent from the graph 391 depicted by FIG. 3H. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 71. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 391.

In one more example, when the customer resolution engine subsequently increments the algorithm variable W from 71 to 81, then the clique threshold equals 81, and the node 318 has a clique count of 80, which is now less than the clique threshold of 81, such that the customer resolution engine identifies the node 318 as a good match key for email addresses, and deletes the node 318, which deletes the edges 362 and 364 that connect to the node 318, in the graph 392, as depicted by FIG. 3I. Since the edges 362 and 364 each have a weight of 80 that is less than the clique threshold of 81, the customer resolution engine would have identified the edges 362 and 364 as good match keys and then deleted the edges 362 and 364 from the graph 392 depicted by FIG. 3I, but the customer resolution engine already deleted the edges 362 and 364 when deleting the node 318 that was identified as a good match key, such that the edges 362 and 364 are absent from the graph 392 depicted by FIG. 3I. Next, the customer resolution engine attempts to include each 3 node clique that is associated with any clique count which is less than the clique threshold in a third set of good match keys, but the estimate of the lowest remaining clique count for a 3 node clique, as described below in reference to block 414, is more than the clique threshold of 81. The customer resolution engine would not attempt to include each quadruplet node clique that is associated with any clique count which is less than the clique threshold in a fourth set of good match keys because the identification of good match keys is limited to 1 node cliques, 2 node cliques, and 3 node cliques for the graph 392.

Collectively, after the customer resolution engine subsequently increments the algorithm variable W from 1 to 81, the clique threshold equals 81, and the nodes 314-328 have clique counts which are less than the clique threshold of 81, such that the customer resolution engine identifies the nodes 314-328 as good match keys for email addresses, and deletes the nodes 314-328, which deletes the edges 354-384 that connect to the nodes 314-328, as depicted by FIG. 3I Although the preceding examples described the identification of good match keys starting with a clique that has one node with the weight or count of 10 and ending with cliques that have one node with the weight or count of 80, the identification of good match keys can include cliques that have any number of nodes with weights or counts of any number. Even though the preceding examples depicted by FIGS. 3A-I and described by the method 400 did not include the identification of any edges as good match keys due to the structure of the corresponding graphs 385-392, the method 400 may identify edges as good match keys. For instance, the preceding examples depicted by FIGS. 1A-F and described by the blocks of method 200, which are substantially similar to the blocks 402 to 410 of the method 400, include the identification of edges as good match keys.

The algorithm above indicates that after each clique threshold incrementation, the customer resolution engine identifies good match keys by comparing the incremented clique threshold to the clique counts of the graph's remaining 1 node cliques (each node), 2 node cliques (each edge), and 3 node cliques (each 3 nodes connected by 3 edges), for a 4-partite graph (the graph 300 represents values for the 4 attributes given name, family name, city, and email, such that the algorithm variable n equals 4). Similarly, the customer resolution engine would compare the incremented clique threshold to the clique counts of the graph's remaining single node cliques and double node cliques for a 3-partite graph, and would compare the incremented clique threshold to the clique counts of the graph's remaining 1 node cliques, 2 node cliques, 3 node cliques, and 4 node cliques (4 nodes connected by at least 4 edges) for a 5-partite graph.

After executing the block 410. the customer resolution engine has identified the nodes 314-328 as good match keys for email addresses, and deleted the nodes 314-328, which deleted the edges 354-384 that connect to the nodes 314-328, thereby resulting in the graph 392, as depicted by FIG. 3. While all of the nodes that the customer resolution engine identified as good match keys and deleted from the graph 392 had a weight or count of less than the clique threshold of 81, all of the remaining nodes in the graph 392 have weights and counts from 500 to 1,500, which are significantly greater than the clique threshold of 81. Even if the customer resolution engine increments the algorithm variable W from 81 to 100, none of the single node cliques or double node cliques remaining in the graph 392 have a weight or count that is less than this increased clique threshold of 100. However, the weight or count of some 3 node cliques may have a weight or count that is less than the increased clique threshold of 100. Therefore, the customer resolution engine may identify such a 3 node clique as a good match key after incrementing the algorithm variable W from 81 to 100.

Following the creation of a graph, a triplet of nodes that are connected by a triplet of edges are identified, block 412. The database system identifies 3 node cliques for which clique counts will be estimated. In embodiments, this can include the customer resolution engine identifying the triplet of nodes 302, 306, 310 (representing San Francisco, John, Jones) connected by the triplet of edges 330, 334, 346; the triplet of nodes 302, 306, 312 (representing San Francisco, John, Smith) connected by the triplet of edges 330, 336, 348; the triplet of nodes 302, 308, 310 (representing San Francisco, Ann, Jones) connected by the triplet of edges 332, 334, 350; and the triplet of nodes 302, 308, 312 (representing San Francisco, Ann, Smith) connected by the triplet of edges 332, 336, 352. The customer resolution engine also identifies the triplet of nodes 304, 306, 310 (representing San Jose, John, Jones) connected by the triplet of edges 338, 342, 346; the triplet of nodes 304, 306, 312 (representing San Jose, John, Smith) connected by the triplet of edges 338, 344, 348; the triplet of nodes 304, 308, 310 (representing San Jose, Ann, Jones) connected by the triplet of edges 340, 342, 350; and the triplet of nodes 304, 308, 312 (representing San Jose, Ann, Smith) connected by the triplet of edges 340, 344, 352. A triplet of nodes can be a set of 3 associated points at which lines or pathways intersect or branch. A triplet of edges can be a set of lines extending from a first node to a second node to a third node.

The identification of a triplet of nodes, which have their 3 nodes' weights, that are connected by a triplet of edges, which their 3 edges' weights, does not result in the direct identification of a clique count for the co-occurrence of the triplet of values represented by the identified triplet of nodes. For example, the triplet of nodes 302, 306, 312 (representing San Francisco, John, Smith) have node weights of 1,100, 1,500, and 1,200, respectively. These triplet of nodes 302, 306, and 312 are connected by the triplet of edges 330, 336, and 348, which have edge weights of 800, 700, and 900, respectively. The edge 330 has a count of 800 instances that the values San Francisco and John represented by the connected nodes 302 and 306, respectively, are associated with each other, the edge 336 has a count of 700 instances that the values San Francisco and Smith represented by the connected nodes 302 and 312, respectively, are associated with each other, and the edge 348 has a count of 900 instances that the values John and Smith represented by the connected nodes 306 and 312, respectively, are associated with each other. A triplet of values can be a set of 3 associated symbols on which operations are performed by a computer.

However, the count of 1,500 for the node 306 representing John not only includes the edge count of 800 from the edge 330 that connects to the node 302 representing San Francisco, but also includes the edge count of 700 from the edge 338 that connects to the node 304 representing San Jose. Similarly, the count of 1,500 for the node 306 representing John not only includes the edge count of 600 from the edge 346 that connects to the node 310 representing Jones, but also includes the edge count of 900 from the edge 348 that connects to the node 312 representing Smith. Likewise, the count of 1,200 for the node 312 representing Smith not only includes the edge count of 700 from the edge 336 that connects to the node 302 representing San Francisco, but also includes the edge count of 500 from the edge 344 that connects to the node 304 representing San Jose. Consequently, the customer resolution engine cannot directly determine how many instances that the values San Francisco, John, and Smith represented by the connected nodes 302, 306, and 312, respectively, are associated with each other.

The edge 330 identifies 800 instances that John and San Francisco are associated with each other, and the node 306 representing John combines these 800 instances of John associated with San Francisco along with 700 instances of John associated with San Jose to result in 1,500 instances of the node 306 representing John. However, the edges 346 and 348 that connect the node 306 representing John to the node 310 representing Jones and the node 312 representing Smith do not indicate how many of the 900 instances of John that are associated with Smith are from the 800 instances of John associated with San Francisco or how many are from the 700 instances of John associated with San Jose, and do not indicate how many of the 600 instances of John that are associated with Jones are from the 800 instances of John associated with San Francisco or how many are from the 700 instances of John associated with San Jose. As complicated as the direct calculations of a clique count may seem for a 3 node clique that is based on only 2 cities, only 2 given names, and only 2 family names, the direct calculations of a clique count would be exponentially more complicated for a 3 node clique that is based on realistic numbers of cities, given names, and family names in a production database system. Therefore, the count of records that store the triplet of values represented by a triplet of nodes connected by a triplet of edges is not directly available, and explicitly computing and storing the values of all triplets can require too much memory or execute too slowly when the data set is large, because there might be too many triplets of values.

Having identified a triplet of nodes, an estimation is made of a clique count associated with a triplet of values which are represented by the triplet of nodes, block 414. The database system estimates clique counts for 3 node cliques. For example, and without limitation, this can include the customer resolution engine estimating the clique count for the triplet of nodes 304, 308, 310 (representing San Jose, Ann, Jones) connected by the triplet of edges 340, 342, 350, based on their node counts and/or their edge counts. In this example, the probability of the value San Jose equals 0.45, which is the count 900 of the node 304 representing San Jose divided by the count of 2,000 database records, the probability of the value Ann equals 0.25, which is the count 500 of the node 308 representing Ann divided by the count of 2,000 database records, and the probability of the value Jones equals 0.40, which is the count 800 of the node 310 representing Jones divided by the count of 2,000 database records. Therefore, the customer resolution engine estimates the clique count for the triplet of nodes 304, 308, 310 (representing San Jose, Ann, Jones) by multiplying the probabilities of the values San Jose, Ann, and Jones by the total number of records, which is 0.45*0.25*0.4*2,000=90 estimated database records. An estimated clique count can be an approximation of an arithmetical value, expressed by a word, symbol, or figure, representing a particular quantity, used in making calculations and associated with a set of one or more nodes where each pair of nodes is connected by an edge. A node count can be an arithmetical value, expressed by a word, symbol, or figure, representing a particular quantity, used in making calculations and associated with a point at which lines or pathways intersect or branch. An edge count can be an arithmetical value, expressed by a word, symbol, or figure, representing a particular quantity, used in making calculations and associated with a line extending from one node to another node.

In another example, the customer resolution engine estimates the clique count for the triplet of nodes 302, 306, 312 (representing San Francisco, John, Smith) connected by the triplet of edges 330, 336, 348, based their node counts and/or their edge counts. In this example, the probability of the value San Francisco equals 0.55, which is the count 1,100 of the node 302 representing San Francisco divided by the count of 2,000 database records, the probability of the value John equals 0.75, which is the count 1,500 of the node 306 representing John divided by the count of 2,000 database records, and the probability of the value Smith equals 0.60, which is the count 1,200 of the node 312 representing Smith divided by the count of 2,000 database records. Therefore, the customer resolution engine estimates the clique count for the triplet of nodes 302, 306, 312 (representing San Francisco, John, Smith) by multiplying the probabilities of the values San Francisco, John, and Smith by the total number of records, which is 0.55*0.75*0.6*2,000=495 estimated database records.

Similarly, the customer resolution engine estimates a clique count of 110 for the triplet of nodes 302, 308, 310 (representing San Francisco, Ann, Jones); a clique count of 135 for the triplet of nodes 304, 308, 312 (representing San Jose, Ann, Smith); and a clique count of 165 for the triplet of nodes 302, 308, 312 (representing San Francisco, Ann, Smith). Likewise, the customer resolution engine estimates a clique count of 270 for the triplet of nodes 304, 306, 310 (representing San Jose, John, Jones); a clique count of 330 for the triplet of nodes 302, 306, 310 (representing San Francisco, John, Jones); and a clique count of 405 for the triplet of nodes 304, 306, 312 (representing San Jose, John, Smith).

In the previous examples of estimating clique counts, the estimates were produced by multiplying the number of the database records by each of the probabilities that database records store the values corresponding to the clique, which is based on the assumption that these probabilities are independent of each other. However, this assumed independence may not be accurate because, for example, San Jose may have a disproportionally large percentage of people named Ann Jones relative to a disproportionally small percentage of people named John Jones and a disproportionally small percentage of people named Ann Smith. Consequently, the percentages of people in San Jose who are named Ann or Jones are similar to other cities' percentages, but the percentage of people named Ann Jones is significantly larger than other cities' percentages. Therefore, assuming independence of values when estimating a clique count can produce errors that can negatively impact the search efficiencies when using the subsequently generated match keys, with the degree of the impact magnified by the magnitudes of the error, the estimate, and/or the number of attributes and/or records in the database.

Consequently, the estimated clique count may also be based on an estimate of independence between probabilities corresponding to the node counts that correspond to the triplet of nodes. Independence can be an entity which is unaffected by other entities. A probability can be the likelihood of something happening or being the case. The estimate of independence may be estimated by using a normalized symmetrical divergence, such as the Jensen-Shannon divergence. A normalized symmetrical divergence can be a measure of dissimilarity between probability metrics that is adjusted to and limited by a scale. For example, the customer resolution engine uses the Jensen-Shannon divergence to estimate the clique count for the triplet of nodes 304, 308, 310 (representing San Jose, Ann, Jones) as follows. If A=Ann, B=Jones, and C=San Jose, then $P_A$=500/2,000=0.25, $P_B$=800/2,000=0.4, $P_C$=900/2,000=0.45, $P_{AB}$=200/2,000=0.1, $P_{AC}$=200/2,000=0.1, and $P_{BC}$=400/2,000=0.2.

$$JSD_{AB} = -(1/2)P_{AB} * \log[(1/2)(P_{AB} + P_A P_B)] / P_{AB} -$$
$$(1/2)P_A P_B * \log[(1/2)(P_{AB} + P_A P_B)] / P_A P_B$$
$$= -0.5 * 0.1 * \log[0.5 * (0.1 + 0.25 * 0.4)] / 0.1 - 0.5 *$$
$$0.25 * 0.4 * \log[0.5 * (0.1 + 0.25 * 0.4)] / 0.25 * 0.4$$
$$= -0.05 * \log(0.1/0.1) - 0.05 * \log(0.1/0.1)$$
$$= -0.05 * \log(1) - 0.05 * \log(1)$$
$$= -0.05 * 0.0 - 0.05 * 0.0$$
$$= 0.0 + 0.0$$
$$= 0.0$$

$$JSD_{AC} = -(1/2)P_{AC} * \log[(1/2)(P_{AC} + P_A P_C)] / P_{AC} -$$
$$(1/2)P_A P_C * \log[(1/2)(P_{AC} + P_A P_C)] / P_A P_C$$
$$= -0.5 * 0.1 * \log[0.5 * (0.1 + 0.25 * 0.45)] / 0.1 - 0.5 *$$
$$0.25 * 0.45 * \log[0.5 * (0.1 + 0.25 * 0.45)] / 0.25 * 0.45$$
$$= -0.05 * \log(0.10625/0.1) - 0.05625 *$$
$$\log(0.10625/0.1125)$$
$$= -0.05 * \log(1.0625) - 0.05625 * \log(0.94444)$$
$$= -0.05 * 0.08746 - 0.05625 * -0.082468$$
$$= -0.004373 + 0.0046388$$
$$= 0.0002658$$

$$JSD_{BC} = -(1/2)P_{BC} * \log[(1/2)(P_{BC} + P_B P_C)] / P_{BC} -$$
$$(1/2)P_B P_C * \log[(1/2)(P_{BC} + P_B P_C)] / P_B P_C$$
$$= -0.5 * 0.2 * \log[(0.5 * (0.2 + 0.4 * 0.45)] / 0.2) - 0.5 *$$
$$0.4 * 0.45 * \log[0.5 * (0.2 + 0.4 * 0.45)] / 0.4 * 0.45$$
$$= -0.1 * \log(0.19/0.2) - 0.09 * \log(0.19/0.18)$$
$$= -0.1 * \log(0.95) - 0.09 * \log(1.0555)$$
$$= -0.1 * -0.07400 - 0.09 * 0.07792$$
$$= 0.0074 - 0.0070128$$
$$= 0.0003872$$

$$I_{ABC} = (1/3)((1 - JSD_{AB}) + (1 - JSD_{AC}) + (1 - JSD_{BC}))$$
$$= (1/3) * ((1 - 0.0) + (1 - 0.0002658) + (1 - 0.0003872)$$
$$= (1/3) * (1.0 + 0.9997342 + 0.9996128)$$
$$= 0.9998 \text{(which indicates 99.98\% independent and}$$
$$0.02\% \text{ dependent)}$$

$$P_{ABC} \approx I_{ABC} * P_A * P_B * P_C + (1 - I_{ABC}) * \min[P_A, P_B, P_C]$$
$$= 0.9998 * 0.25 * 0.4 * 0.45 + (1 - 0.9998) *$$
$$\min[0.25, 0.4, 0.45]$$
$$= 0.9998 * 0.045 + 0.0002 * 0.25$$
$$= 0.04499 + 0.00005$$
$$= 0.04504$$

After using the Jensen-Shannon divergence to estimate the independence of 99.98% between the triplet of values, the customer resolution engine multiplies the estimated probability of 0.04504 by the 2,000 records in the database, which results in the estimated clique count of 90.0 for the triplet of nodes 304, 308, 310 (representing San Jose, Ann, Jones). While this example does not illustrate any difference occurring in the estimation of a clique count that is used to identify whether a triplet of values is a good match key when the estimated dependence was only 0.02% for a database system that stores only 2,000 records, the differences in the identification and use of match keys can be significantly greater for the typical database systems that store millions of records.

In another example, the customer resolution engine uses the Jensen-Shannon divergence to estimate the clique count for the triplet of nodes 302, 306, 312 (representing San Francisco, John, Smith) as follows. If A=San Francisco, B=John, and C=Smith, then $P_A$=1,100/2,000=0.55, $P_B$=1,500/2,000=0.75, $P_C$=1,200/2,000=0.6, $P_{AB}$=800/2,000=0.4, $P_{AC}$=700/2,000=0.35, and $P_{BC}$=900/2,000=0.45.

$$JSD_{AB} = -(1/2)P_{AB} * \log[[(1/2)(P_{AB} + P_A P_B)] / P_{AB}) -$$
$$(1/2)P_A P_B * \log[(1/2)(P_{AB} + P_A P_B)] / P_A P_B$$
$$= -0.5 * 0.4 * \log[0.5 * (0.4 + 0.55 * 0.75)] / 0.4) - 0.5 *$$
$$0.55 * 0.75 * \log[0.5 * (0.4 + 0.55 * 0.75)] / 0.55 * 0.75$$
$$= -0.2 * \log(0.40625/0.4) - 0.20625 *$$
$$\log(0.40625/0.4125)$$
$$= -0.2 * \log(1.0156) - 0.20625 * \log(0.9848)$$
$$= -0.2 * 0.022332 - 0.20625 * -0.022097$$
$$= -0.0044664 + 0.0045575$$
$$= 0.0000935$$

$$JSD_{AC} = -(1/2)P_{AC} * \log[(1/2)(P_{AC} + P_A P_C)] / P_{AC} -$$
$$(1/2)P_A P_C * \log[(1/2)(P_{AC} + P_A P_C)] / P_A P_C$$
$$= -0.5 * 0.35 * \log[[0.5 * (0.35 + 0.55 * 0.6)/0.35]) -$$
$$0.5 * 0.55 * 0.6 * \log[0.5 * (0.35 + 0.55 * 0.6)/0.55 * 0.6/]$$
$$= -0.175 * \log(0.34/0.35) - 0.165 * \log(0.34/0.33)$$
$$= -0.175 * \log(0.97143) - 0.165 * \log(1.03030)$$
$$= -0.175 * -0.04181 - 0.165 * 0.043064$$
$$= 0.0073168 + 0.0071055$$
$$= 0.0002113$$

$$JSD_{BC} = -(1/2)P_{BC} * \log[[(1/2)(P_{BC} + P_B P_C)] / P_{BC}) -$$
$$(1/2)P_B P_C * \log[(1/2)(P_{BC} + P_B P_C)] / P_B P_C$$
$$= -0.5 * 0.45 * \log[0.5 * (0.45 + 0.75 * 0.6)] / 0.45) -$$
$$0.5 * 0.75 * 0.6 * \log[0.5 * (0.45 + 0.75 * 0.6)] / 0.75 * 0.6$$
$$= -0.225 * \log(0.45/0.45) - 0.225 * \log(0.45/0.45)$$
$$= -0.225 * \log(1) - 0.225 * \log(1)$$
$$= -0.225 * 0.0 - 0.225 * 0.0$$
$$= 0.0 + 0.0$$
$$= 0.0$$

$$I_{ABC} = (1/3)((1 - JSD_{AB}) + (1 - JSD_{AC}) + (1 - JSD_{BC}))$$
$$= (1/3) * ((1 - 0.0000935) + (1 - 0.0002113) + (1 - 0.0))$$
$$= (1/3) * (0.9999065 + 0.9997887 + 1.0)$$
$$= 0.9999 \text{(which indicates 99.99\% independent and}$$
$$0.01\% \text{ dependent)}$$

$$P_{ABC} \approx I_{ABC} * P_A * P_B * P_C + (1 - I_{ABC}) * \min[P_A, P_B, P_C]$$
$$= 0.9999 * 0.55 * 0.75 * 0.6 + (1 - 0.9999) *$$
$$\min[0.55, 0.75, 0.60]$$
$$= 0.9999 * 0.2475 + 0.0001 * 0.55$$
$$= 0.247475 + 0..00005$$
$$= 0.24753$$

After using the Jensen-Shannon divergence to estimate the independence of 99.99% between the triplet of values, the customer resolution engine multiplies the estimated probability of 0.024753 by the 2,000 records in the database, which results in the estimated clique count of 495.0 for the triplet of nodes 302, 306, 312 (representing San Francisco, John, Smith). While this example does not illustrate any difference occurring in the estimation of a clique count that is used to identify whether a triplet of values is a good match key when the estimated dependence is only 0.01% for a database system that stores only 2,000 records, the differences in the identification and use of match keys can be significantly greater for the typical database systems that store millions of records.

These previous examples of using the Jensen-Shannon divergence to estimate the independence between the triplet of values resulted in estimating the independence of the variables as nearly 100% independent, which results in no changes occurring in the estimation of the clique counts for any of the 8 triplets of values corresponding to the nodes 302-312. The following counts illustrate an alternative example for which the customer resolution engine estimates the independence of the variables as significantly dependent for 800 database records. In this alternative example, a graph includes a first node that has a count of 300 and represents the given name Bob, a second node that has a count of 360 and represents the family name Jones, and a third node that has a count of 580 and represents the city name Oakland, The graph also includes a first edge that has a count of 40 and that connects the first node that represents Bob with the second node that represents Brown, a second edge that has a count of 240 and that connects the first node that represents Bob with the third node that represents Oakland, and a third edge that has a count of 280 and that connects the second node that represents Brown with the third node that represents Oakland. If A=Bob, B=Brown, and C=Oakland, then $P_A=300/800=0.375$, $P_B=360/800=0.45$, $P_C=580/800=0.725$, $P_{AB}=40/800=0.05$, $P_{AC}=240/800=0.3$, and $P_{BC}=280/800=0.35$.

$$\begin{aligned} JSD_{AB} &= -(1/2)P_{AB} * \log[[(1/2)(P_{AB} + P_A P_B)]/P_{AB}] - \\ &\quad (1/2)P_A P_B * \log[(1/2)(P_{AB} + P_A P_B)]/P_A P_B \\ &= -0.5 * 0.05 * \log[[0.5*(0.05 + 0.375*0.45)]/0.05) - \\ &\quad 0.5 * 0.375 * 0.45 * \log[0.5*(0.05 + 0.375 * \\ &\quad 0.45)]/0.375 * 0.45 \\ &= -0.025 * \log(0.109375/0.05) - 0.084375 * \\ &\quad \log(0.109375/0.16875) \\ &= -0.025 * \log(2.1875) 0.084375 * \log(0.64814) \\ &= -0.025 * 1.12928 - 0.084375 * -0.62562 \\ &= -0.028232 + 0.052786 \\ &= 0.024554 \end{aligned}$$

$$\begin{aligned} JSD_{AC} &= -(1/2)P_{AC} * \log[[(1/2)(P_{AC} + P_A P_C)]/P_{AC}] - \\ &\quad (1/2)P_A P_C * \log[(1/2)(P_{AC} + P_A P_C)]/P_A P_C \\ &= 0.5 * 0.3 * \log[[0.5*(0.3 + 0.375*0.725)]/0.3) - \\ &\quad -0.5 * 0.375 * 0.725 * \log[0.5*(0.3 + 0.375 * \\ &\quad 0.725)]/0.375 * 0.725 \\ &= -0.15 * \log(0.28594/0.3) - 0.13594 * \\ &\quad \log(0.28594/0.27188) \\ &= -0.15 * \log(0.95313) - 0.13594 * \log(1.0517) \\ &= -0.15 * -0.069255 - 0.13594 * 0.072723 \\ &= 0.010388 - 0.0098859 \\ &= 0.0005021 \end{aligned}$$

$$\begin{aligned} JSD_{BC} &= -(1/2)P_{BC} * \log[[(1/2)(P_{BC} + P_B P_C)]/P_{BC}] - \\ &\quad (1/2)P_B P_C * \log[(1/2)(P_{BC} + P_B P_C)]/P_B P_C \\ &= -0.5 * 0.35 * \log[[0.5*(0.35 + 0.45*0.725)]/0.35) - \\ &\quad 0.5 * 0.45 * 0.725 * \log[0.5*(0.35 + 0.45 * \\ &\quad 0.725)]/0.45 * 0.725 \\ &= -0.175 * \log(0.33812/0.35) - 0.16312 * \\ &\quad \log(0.33812/0.32625) \\ &= -0.175 * \log(0.96606) - 0.16312 * \log(1.0364) \\ &= -0.175 * -0.049815 - 0.016312 * 0.051580 \\ &= 0.0087176 - 0.0084137 \\ &= 0.0003039 \end{aligned}$$

$$\begin{aligned} I_{ABC} &= (1/3)((1 - JSD_{AB}) + (1 - JSD_{AC}) + (1 - JSD_{BC})) \\ &= (1/3)*((1 - 0.024554) + (1 - 0.0005021) + (1 - \\ &\quad 0.0003039) \\ &= (1/3)*(0.975446 + 0.9994979 + 0.9996961) \\ &= 0.99155 \text{(which indicates 99.155\% independent and} \\ &\quad 0.845\% \text{ dependent)} \end{aligned}$$

$$\begin{aligned} P_{ABC} &\approx I_{ABC} * P_A * P_B * P_C + (1 - I_{ABC}) * \min[P_A, P_B, P_C] \\ &= 0.99155 * 0.375 * 0.45 * 0.725 + (1 - 0.99155) * \\ &\quad \min[0.375, 0.45, 0.725] \\ &= 0.99155 * 0.1223 + 0.00845 * 0.375 \\ &= 0.12127 + 0.0031688 \\ &= 0.124438 \end{aligned}$$

After using the Jensen-Shannon divergence to estimate the independence of 99.155% between the triplet of values, the customer resolution engine multiplies the estimated probability of 0.124438 by the 800 records in the database, which results in the estimated clique count of 100 for the triplet of nodes that represents Bob, Brown, and Oakland. If the customer resolution engine had estimated the clique count based on an assumption of 100% independence between the triplet of values, the customer resolution engine would have multiplied the node probabilities $P_A=0.375$, $P_B=0.45$, and $P_C=0.725$ to produce the estimated probability of 0.1223. Then the customer resolution engine would have multiplied the 100% independence-based estimated probability of 0.1223 by the 800 records in the database to result in the estimated clique count of 98 for the triplet of nodes that represents Bob, Brown, and Oakland. which would have resulted in identifying the values Bob, Brown, Oakland as a good match key when the clique threshold equaled 100. Instead, by using the Jensen-Shannon divergence to estimate the independence of 99.155% between the triplet of values, the customer resolution engine increases the estimated clique count by a count of 2 from 98 to 100. This increased estimate of clique counts results in excluding the values Bob, Brown, Oakland as a good match key if the clique threshold equals 100 and if using match keys based on values co-occurring in 100 or more records in the database is not efficient for searching and matching database records. While this alternative example illustrates a difference that occurs in the identification of a good match key when the estimated dependence was less than 1% for a database system that stores only 800 records, the differences in the identification and use of match keys can be significantly greater for the typical database systems that store millions of records.

After estimating a clique count, a determination is made whether the estimated clique count is less than the clique threshold, block 416. The database system determines if a 3 node clique is a good match key based on the estimated clique count. By way of example and without limitation, this includes the customer resolution engine determining whether the estimated clique count of 90 for the triple of values [San Jose, Ann, Jones] is less than the incremented clique threshold of 91. In another example, the customer resolution engine determines whether the estimated clique count of 495 for the triple of values [San Francisco, John, Smith] is less than the incremented clique threshold of 91. If the estimated clique count is less than the clique threshold, the method 400 continues to block 418 to include the triplet of values in a third set of good match keys. If the estimated clique count is not less than the clique threshold, the method 400 proceeds to block 420 to exclude the triplet of values from the third set of good match keys.

If the estimated clique count is less than the clique threshold, the triplet of values is included in a third set of good keys, block 418. The database system identifies 3 node cliques with low estimated clique counts as good match keys. In embodiments, this can include a customer resolution engine identifying the triple of values [San Jose, Ann, Jones] corresponding to the nodes 304, 308, and 310 as a good match key, because the estimated clique count of 90 for the triple of values [San Jose, Ann, Jones] is less than the incremented clique threshold of 91. Then the customer resolution engine identifies the triplet of nodes 304, 308, and 310 as having been analyzed.

If the estimated clique count is not less than the clique threshold, the triplet of values is excluded from the third set of good match keys, block 420. The database system identifies 3 node cliques with high estimated clique counts as inadequate to be good match keys. For example, and without limitation, this can include the customer resolution engine excluding the triple of values [San Francisco, John, Smith] as a match key because the estimated clique count of 495 for the triple of values [San Francisco, John, Smith] is not less than the incremented clique threshold of 91.

Following the identification of sets of keys, new records are matched by using each set of keys to search corresponding records, block 422. The database system uses the match keys to identify existing database records that match a newly received database record. By way of example and without limitation, this includes the customer resolution engine using the match key [Ann, Jones, San Jose] of the match keys [ajones@fab.com], [ajones@electro.com], [amith@hyper.com], [asmith@ great.com], [jjones@best.com], [jjones@acme.com], [jsmith@digi.com], [jsmith@compu.com], and [Ann, Jones, San Jose] to efficiently search and match MegaCorp's existing records for Ann Jones when she enters her name and San Jose while visiting MegaCorp's marketing website. By using the match keys in the order that the match keys were identified, the customer resolution engine favors smaller cliques over larger cliques and favors lower-weight cliques over higher-weight cliques. The customer resolution engine generates match keys that have a near-perfect recall (they almost never miss any matches) while being orders of magnitude faster than a naive approach that would deep-match all pairs of database records.

Since the only estimated clique count that is less than the incremented clique threshold of 91 is the estimated clique count of 90 for the triplet of values [Ann, Jones, San Jose], the customer resolution engine does not identify any of the other triplets of values as a good match key. However, if the customer resolution engine incremented the clique threshold from 91 to 111, then the estimated clique count of 110 for the triplet of nodes 302, 308, 310 (representing San Francisco, Ann, Jones) would be less than the incremented clique threshold of 111. In this situation, the customer resolution engine would identify the values [San Francisco, Ann, Jones] as an additional good match key. However, the customer resolution engine may stop incrementing the clique threshold before the clique threshold reaches 111 because using match keys based on values co-occurring in 100 or more records in the database may not be efficient for searching and matching database records. Consequently, the customer resolution engine may not base any match keys on the triplet of nodes 304, 308, 312 (representing San Jose, Ann, Smith); the triplet of nodes 302, 308, 312 (representing San Francisco, Ann, Smith; the triplet of nodes 304, 306, 310 (representing San Jose, John, Jones); the triplet of nodes 302, 306, 310 (representing San Francisco, John, Jones); or the triplet of nodes 304, 306, 312 (representing San Jose, John, Smith).

The method 400 may be repeated as desired. Although this disclosure describes the blocks 402-422 executing in a particular order, the blocks 402-422 may be executed in a different order. In other implementations, each of the blocks 402-422 may also be executed in combination with other blocks and/or some blocks may be divided into a different set of blocks.

System Overview

Figure 5:
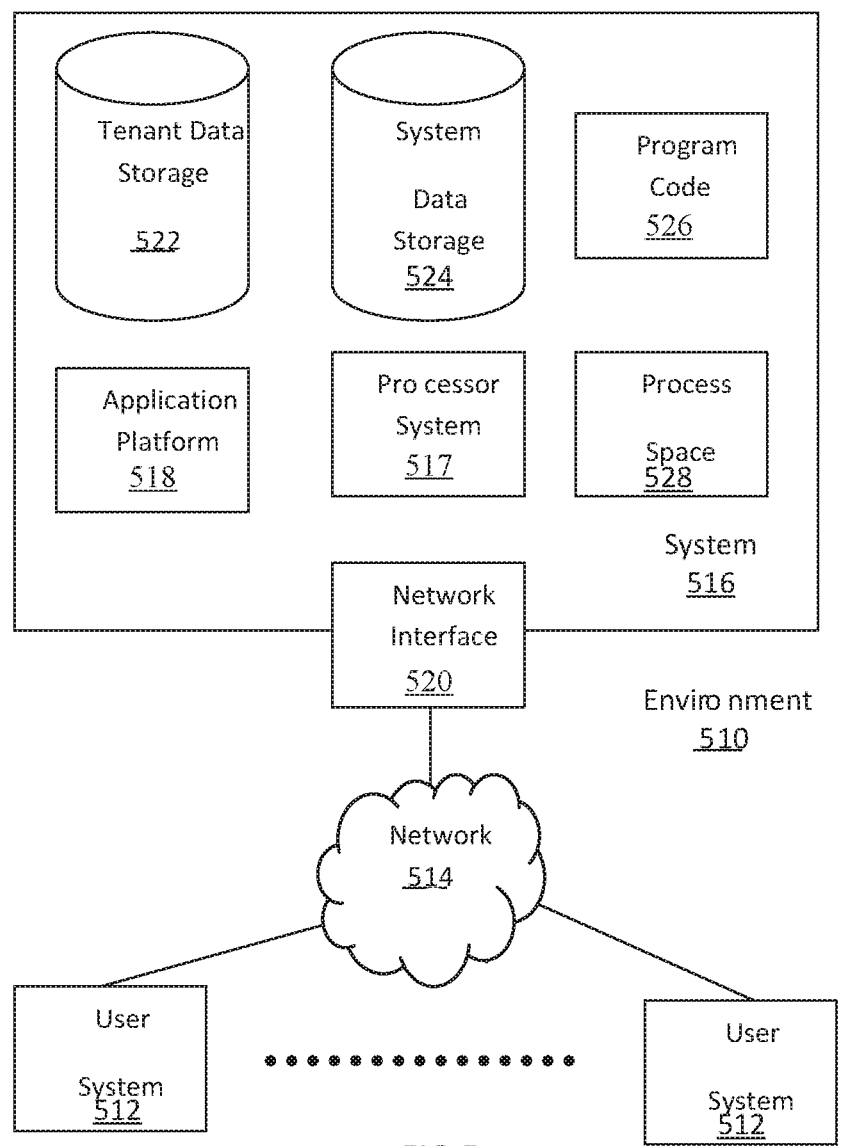
FIG. 5 illustrates a block diagram of an example of an environment wherein an on-demand database service might be used.

FIG. 5 illustrates a block diagram of an environment 510 wherein an on-demand database service might be used. The environment 510 may include user systems 512, a network 514, a system 516, a processor system 517, an application platform 518, a network interface 520, a tenant data storage 522, a system data storage 524, program code 526, and a process space 528. In other embodiments, the environment 510 may not have all of the components listed and/or may have other elements instead of, or in addition to, those listed above.

The environment 510 is an environment in which an on-demand database service exists. A user system 512 may be any machine or system that is used by a user to access a database user system. For example, any of the user systems 512 may be a handheld computing device, a mobile phone, a laptop computer, a work station, and/or a network of computing devices. As illustrated in FIG. 5 (and in more detail in FIG. 6) the user systems 512 might interact via the network 514 with an on-demand database service, which is the system 516.

An on-demand database service, such as the system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 516" and the "system 516" will be used interchangeably herein. A database image may include one or more database objects. A relational database management system (RDMS) or the equivalent may execute storage and retrieval of information against the database object(s). The application platform 518 may be a framework that allows the applications of the system 516 to run, such as the hardware and/or software, e.g., the operating system. In an embodiment, the on-demand database service 516 may include the application platform 518 which enables creation, managing and executing one or more applications developed by the provider of the on-demand database service, users accessing the on-demand database service via user systems 512, or third-party application developers accessing the on-demand database service via the user systems 512.

The users of the user systems 512 may differ in their respective capacities, and the capacity of a particular user system 512 might be entirely determined by permissions (permission levels) for the current user. For example, where a salesperson is using a particular user system 512 to interact with the system 516, that user system 512 has the capacities allotted to that salesperson. However, while an administrator is using that user system 512 to interact with the system 516, that user system 512 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 514 is any network or combination of networks of devices that communicate with one another. For example, the network 514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 512 might communicate with the system 516 using TCP/IP and, at a higher network level, use other common Internet protocols to communicate, such as HTTP, FTP, AFS, WAP, etc. In an example where HTTP is used, the user systems 512 might include an HTTP client commonly referred to as a "browser" for sending and receiving HTTP messages to and from an HTTP server at the system 516. Such an HTTP server might be implemented as the sole network interface between the system 516 and the network 514, but other techniques might be used as well or instead. In some implementations, the interface between the system 516 and the network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 516, shown in FIG. 5, implements a web-based customer relationship management (CRM) system. For example, in one embodiment, the system 516 includes application servers configured to implement and execute CRM software applications as well as provide related data, code, forms, webpages and other information to and from the user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 516 implements applications other than, or in addition to, a CRM application. For example, the system 516 may provide tenant access to multiple hosted (standard and custom) applications, including a CRM application. User (or third-party developer) applications, which may or may not include CRM, may be supported by the application platform 518, which manages creation, storage of the applications into one or more database objects and executing of the applications in a virtual machine in the process space of the system 516.

One arrangement for elements of the system 516 is shown in FIG. 5, including the network interface 520, the application platform 518, the tenant data storage 522 for tenant data 523, the system data storage 524 for system data 525 accessible to the system 516 and possibly multiple tenants, the program code 526 for implementing various functions of the system 516, and the process space 528 for executing MTS system processes and tenant-specific processes, such as running applications as part of an application hosting service. Additional processes that may execute on the system 516 include database indexing processes.

Several elements in the system shown in FIG. 5 include conventional, well-known elements that are explained only briefly here. For example, each of the user systems 512 could include a desktop personal computer, workstation, laptop, PDA, cell phone, or any wireless access protocol (WAP) enabled device or any other computing device capable of interfacing directly or indirectly to the Internet or other network connection. Each of the user systems 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 512 to access, process and view information, pages and applications available to it from the system 516 over the network 514. Each of the user systems 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 516 or other systems or servers. For example, the user interface device may be used to access data and applications hosted by the system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 512 and all of its components are operator configurable using applications, such as a browser, including computer code run using a central processing unit such as an Intel Pentium® processor or the like. Similarly, the system 516 (and additional instances of an MTS, where more than one is present) and all of their components might be operator configurable using application(s) including computer code to run using a central processing unit such as the processor system 517, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 516 is configured to provide webpages, forms, applications, data and media content to the user (client) systems 512 to support the access by the user systems 512 as tenants of the system 516. As such, the system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 6:
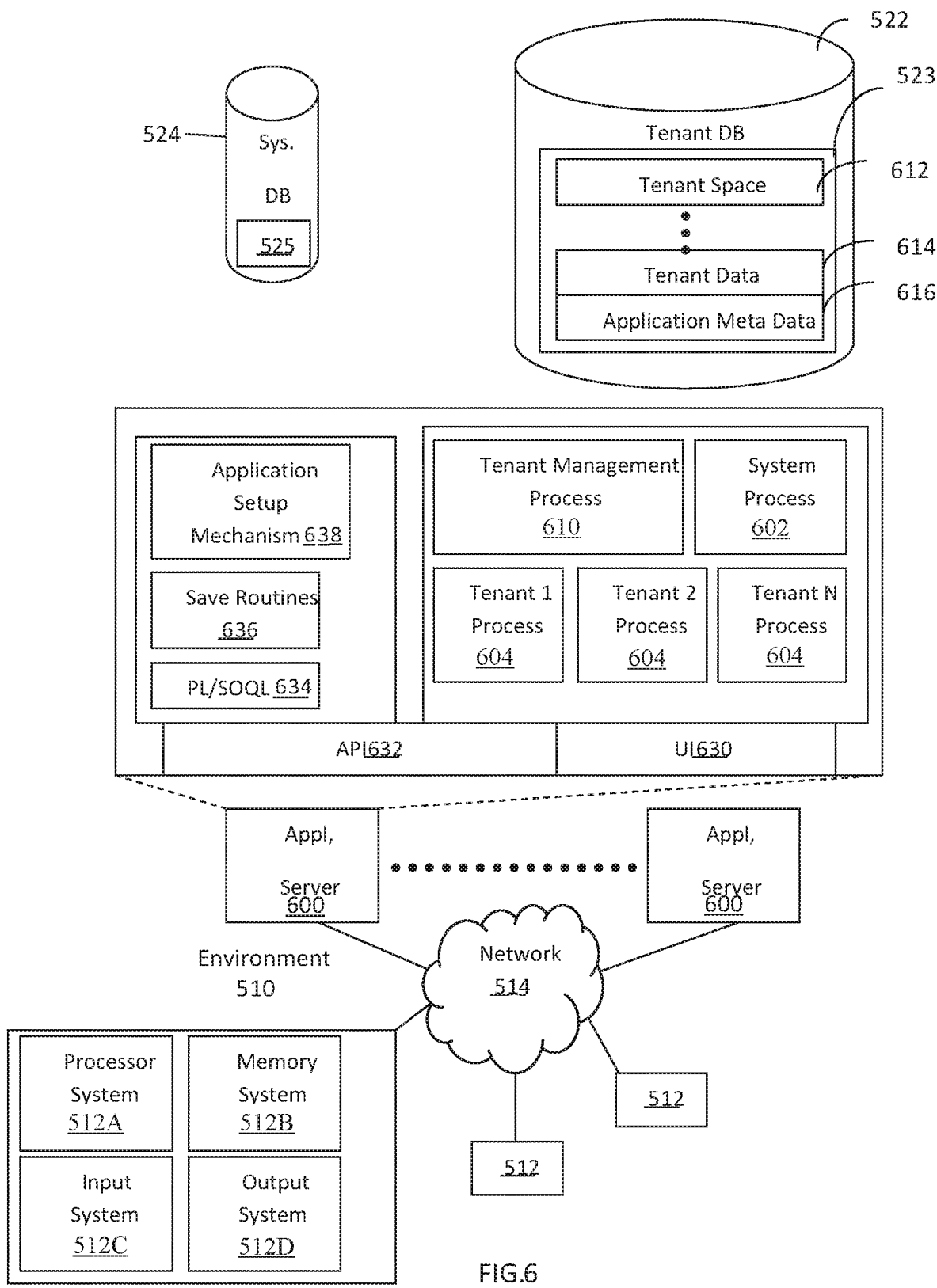
FIG. 6 illustrates a block diagram of an embodiment of elements of FIG. 5 and various possible interconnections between these elements.

FIG. 6 also illustrates the environment 510. However, in FIG. 6 elements of the system 516 and various interconnections in an embodiment are further illustrated. FIG. 6 shows that the each of the user systems 512 may include a processor system 512A, a memory system 512B, an input system 512C, and an output system 512D. FIG. 6 shows the network 514 and the system 516. FIG. 6 also shows that the system 516 may include the tenant data storage 522, the tenant data 523, the system data storage 524, the system data 525, a User Interface (UI) 630, an Application Program Interface (API) 632, a PL/SOQL 634, save routines 636, an application setup mechanism 638, applications servers $600_1$-$600_N$, a system process space 602, tenant process spaces 604, a tenant management process space 610, a tenant storage area 612, a user storage 614, and application metadata 616. In other embodiments, the environment 510 may not have the same elements as those listed above and/or may have other elements instead of, or in addition to, those listed above.

The user systems 512, the network 514, the system 516, the tenant data storage 522, and the system data storage 524 were discussed above in FIG. 5. Regarding the user systems 512, the processor system 512A may be any combination of one or more processors. The memory system 512B may be any combination of one or more memory devices, short term, and/or long-term memory. The input system 512C may be any combination of input devices, such as one or more keyboards, mice, trackballs, scanners, cameras, and/or interfaces to networks. The output system 512D may be any combination of output devices, such as one or more monitors, printers, and/or interfaces to networks. As shown by FIG. 6, the system 516 may include the network interface 520 (of FIG. 5) implemented as a set of HTTP application servers 600, the application platform 518, the tenant data storage 522, and the system data storage 524. Also shown is the system process space 602, including individual tenant process spaces 604 and the tenant management process space 610. Each application server 600 may be configured to access tenant data storage 522 and the tenant data 523 therein, and the system data storage 524 and the system data 525 therein to serve requests of the user systems 512. The tenant data 523 might be divided into individual tenant storage areas 612, which may be either a physical arrangement and/or a logical arrangement of data. Within each tenant storage area 612, the user storage 614 and the application metadata 616 might be similarly allocated for each user. For example, a copy of a user's most recently used (MRU) items might be stored to the user storage 614. Similarly, a copy of MRU items for an entire organization that is a tenant might be stored to the tenant storage area 612. The UI 630 provides a user interface and the API 632 provides an application programmer interface to the system 516 resident processes to users and/or developers at the user systems 512. The tenant data and the system data may be stored in various databases, such as one or more Oracle™ databases.

The application platform 518 includes the application setup mechanism 638 that supports application developers' creation and management of applications, which may be saved as metadata into the tenant data storage 522 by the save routines 636 for execution by subscribers as one or more tenant process spaces 604 managed by the tenant management process 610 for example. Invocations to such applications may be coded using the PL/SOQL 634 that provides a programming language style interface extension to the API 632. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes.

Invocations to applications may be detected by one or more system processes, which manages retrieving the application metadata 616 for the subscriber making the invocation and executing the metadata as an application in a virtual machine.

Each application server 600 may be communicably coupled to database systems, e.g., having access to the system data 525 and the tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also may be used. For example, in certain embodiments, three consecutive requests from the same user could hit three different application servers 600, and three requests from different users could hit the same application server 600. In this manner, the system 516 is multi-tenant, wherein the system 516 handles storage of, and access to, different objects, data and applications across disparate users and organizations.

As an example of storage, one tenant might be a company that employs a sales force where each salesperson uses the system 516 to manage their sales process. Thus, a user might maintain contact data, leads data, customer follow-up data, performance data, goals and progress data, etc., all applicable to that user's personal sales process (e.g., in the tenant data storage 522). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 516 might also maintain system level data usable by multiple tenants or other data. Such system level data might include industry reports, news, postings, and the like that are sharable among tenants.

In certain embodiments, the user systems 512 (which may be client systems) communicate with the application servers 600 to request and update system-level and tenant-level data from the system 516 that may require sending one or more queries to the tenant data storage 522 and/or the system data storage 524. The system 516 (e.g., an application server 600 in the system 516) automatically generates one or more SQL statements (e.g., one or more SQL queries) that are designed to access the desired information. The system data storage 524 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
create a graph of a plurality of nodes connected by a plurality of edges, the plurality of nodes including: i) a first node associated with a first value and a count of the first value, and ii) a second node associated with a second value and a count of the second value, the plurality of edges including an edge that connects the first and second nodes and is associated with a count of instances of the first value being stored with the second value;
include each node that is associated with any clique count which is less than a clique threshold in a first set of keys;
delete each node that is associated with any clique count which is less than the clique threshold;
include each edge that is associated with any clique count which is less than the clique threshold in a second set of keys:
delete each edge that is associated with any clique count which is less than the clique threshold;
identify a triplet of nodes that are connected by a triplet of edges;
estimate a clique count associated with a triplet of values which are represented by the triplet of nodes;
determine whether the estimated clique count is less than the clique threshold;
include the triplet of values in a third set of keys, and identify the triplet of nodes as analyzed, in response to a determination that the estimated clique count is less than the clique threshold; and
match new records by using each set of keys to search corresponding records.

2. The system of claim 1, wherein including each node that is associated with any clique count which is less than the clique threshold in the first set of keys comprises including each node that is associated with a first clique count in the first set of keys, increasing the first clique count to a second clique count, and including each node that is associated with the second clique count in the first set of keys, and deleting each node that is associated with any clique count which is less than the clique threshold comprises deleting each node that is associated with the first clique count and deleting each node that is associated with the second clique count.

3. The system of claim 1, wherein including each edge that is associated with any clique count which is less than the clique threshold in the second set of keys comprises including each edge that is associated with the first clique count in the second set of keys, increasing the first clique count to a second clique count, and including each edge that is associated with the second clique count in the second set of keys, and deleting each edge that is associated with any clique count which is less than the clique threshold comprises deleting each edge that is associated with the first clique count and deleting each edge that is associated with the second clique count.

4. The system of claim 1, wherein the estimated clique count is based on at least one of node counts and edge counts that correspond to the triplet of nodes.

5. The system of claim 4, wherein the estimated clique count is further based on an estimate of independence between probabilities corresponding to the node counts that correspond to the triplet of nodes.

6. The system of claim 5, wherein the estimate of independence is estimated by using a normalized symmetrical divergence.

7. The system of claim 1, comprising further instructions, which when executed, cause the one or more processors to exclude the triplet of values from the third set of keys in response to a determination that the estimated clique count is not less than the clique threshold.

8. A computer program product comprising computer-readable program code to be executed by one or more processors when retrieved from a non-transitory computer-readable medium, the program code including instructions to:
create a graph of a plurality of nodes connected by a plurality of edges, the plurality of nodes including: i) a first node associated with a first value and a count of the first value, and ii) a second node associated with a second value and a count of the second value, the plurality of edges including an edge that connects the first and second nodes and is associated with a count of instances of the first value being stored with the second value;
include each node that is associated with any clique count which is less than a clique threshold in a first set of keys;
delete each node that is associated with any clique count which is less than the clique threshold;
include each edge that is associated with any clique count which is less than the clique threshold in a second set of keys:
delete each edge that is associated with any clique count which is less than the clique threshold;
identify a triplet of nodes that are connected by a triplet of edges;
estimate a clique count associated with a triplet of values which are represented by the triplet of nodes;
determine whether the estimated clique count is less than the clique threshold;
include the triplet of values in a third set of keys, and identify the triplet of nodes as analyzed, in response to a determination that the estimated clique count is less than the clique threshold; and
match new records by using each set of keys to search corresponding records.

9. The computer program product of claim 8, wherein including each node that is associated with any clique count which is less than the clique threshold in the first set of keys comprises including each node that is associated with a first clique count in the first set of keys, increasing the first clique count to a second clique count, and including each node that is associated with the second clique count in the first set of keys, and deleting each node that is associated with any clique count which is less than the clique threshold comprises deleting each node that is associated with the first clique count and deleting each node that is associated with the second clique count.

10. The computer program product of claim 8, wherein including each edge that is associated with any clique count which is less than the clique threshold in the second set of keys comprises including each edge that is associated with the first clique count in the second set of keys, increasing the first clique count to a second clique count, and including each edge that is associated with the second clique count in the second set of keys, and deleting each edge that is associated with any clique count which is less than the clique threshold comprises deleting each edge that is associated with the first clique count and deleting each edge that is associated with the second clique count.

11. The computer program product of claim 8, wherein the estimated clique count is based on at least one of node counts and edge counts that correspond to the triplet of nodes.

12. The computer program product of claim 11, wherein the estimated clique count is further based on an estimate of independence between probabilities corresponding to the node counts that correspond to the triplet of nodes.

13. The computer program product of claim 12, wherein the estimate of independence is estimated by using a normalized symmetrical divergence.

14. The computer program product of claim 8, wherein the program code comprises further instructions to exclude the triplet of values from the third set of keys in response to a determination that the estimated clique count is not less than the clique threshold.

15. A computer-implemented method comprising:
creating, by a database system, a graph of a plurality of nodes connected by a plurality of edges, the plurality of nodes including: i) a first node associated with a first value and a count of the first value, and ii) a second node associated with a second value and a count of the second value, the plurality of edges including an edge that connects the first and second nodes and is associated with a count of instances of the first value being stored with the second value;
including, by the database system, each node that is associated with any clique count which is less than a clique threshold in a first set of keys;
deleting, by the database system, each node that is associated with any clique count which is less than the clique threshold;
including, by the database system, each edge that is associated with any clique count which is less than the clique threshold as a second set of keys:
deleting, by the database system, each edge that is associated with any clique count which is less than the clique threshold;
identifying, by the database system, a triplet of nodes that are connected by a triplet of edges;
estimating, by the database system, a clique count associated with a triplet of values which are represented by the triplet of nodes;
determining, by the database system, whether the estimated clique count is less than the clique threshold;
including, by the database system, the triplet of values in a third set of keys, and identify the triplet of nodes as analyzed, in response to a determination that the estimated clique count is less than the clique threshold; and
matching, by the database system, new records by using each set of keys to search corresponding records.

16. The computer-implemented method of claim 15, wherein including, by the database system, each node that is associated with any clique count which is less than the clique threshold in the first set of keys comprises including, by the database system, each node that is associated with a first clique count in the first set of keys, increasing, by the database system, the first clique count to a second clique count, and including, by the database system, ach node that is associated with the second clique count in the first set of keys, and deleting, by the database system, each node that is associated with any clique count which is less than the clique threshold comprises deleting, by the database system, each node that is associated with the first clique count and deleting, by the database system, each node that is associated with the second clique count.

17. The computer-implemented method of claim 15, wherein including, by the database system, each edge that is associated with any clique count which is less than the clique threshold in the second set of keys comprises including, by the database system, each edge that is associated with the first clique count in the second set of keys, increasing, by the database system, the first clique count to a second clique count, and including, by the database system, each edge that is associated with the second clique count in the second set of keys, and deleting, by the database system, each edge that is associated with any clique count which is less than the clique threshold comprises deleting, by the database system, each edge that is associated with the first clique count and deleting, by the database system, each edge that is associated with the second clique count.

18. The computer-implemented method of claim 15, wherein the estimated clique count is based on at least one of node counts and edge counts that correspond to the triplet of nodes.

19. The computer-implemented method of claim 18, wherein the estimated clique count is further based on an estimate of independence between probabilities corresponding to the node counts that correspond to the triplet of nodes, and the estimate of independence is estimated by using a normalized symmetrical divergence.

20. The computer-implemented method of claim 15, the computer-implemented method further comprising excluding, by the database system, the triplet of values from the third set of keys in response to a determination that the estimated clique count is not less than the clique threshold.

* * * * *